US012228061B2

(12) United States Patent
Pandit et al.

(10) Patent No.: US 12,228,061 B2
(45) Date of Patent: Feb. 18, 2025

(54) DECOMPOSITION CHAMBER WITH GUIDE SWIRL MIXER

(71) Applicant: Cummins Emission Solutions Inc., Columbus, IN (US)

(72) Inventors: Gaurav Hemant Pandit, Columbus, IN (US); Allick Mounir Olive, Columbus, IN (US); Sagar Maruti Jarali, Belagavi (IN); Narenthiran Thangamuthu, Nasiyanur (IN); Ramesh Ramavath, Turkayamjal (IN); Alex Harrington, Columbus, IN (US); Samuel Johnson, Columbus, IN (US); Sriram Narayanasamy, Greenwood, IN (US); Enoch Nanduru, Pune (IN); George Eugene Mavroudis, Oregon, WI (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 17/851,361

(22) Filed: Jun. 28, 2022

(65) Prior Publication Data

US 2023/0003158 A1 Jan. 5, 2023

(30) Foreign Application Priority Data

Jun. 30, 2021 (IN) .............................. 202141029362

(51) Int. Cl.
*F01N 3/20* (2006.01)
*B01D 53/94* (2006.01)
(Continued)

(52) U.S. Cl.
CPC ....... *F01N 3/2066* (2013.01); *B01D 53/9418* (2013.01); *B01D 53/9431* (2013.01);
(Continued)

(58) Field of Classification Search
CPC .. F01N 3/2066; F01N 3/2892; F01N 2610/02; F01N 2610/1453; F01N 3/00;
(Continued)

(56) References Cited

U.S. PATENT DOCUMENTS 7,533,520 B2   5/2009  Cheng et al.
8,789,363 B2   7/2014  Iverson et al.
(Continued)

FOREIGN PATENT DOCUMENTS

CN   106232955 A   12/2016
CN   108374708 A    8/2018
(Continued)

OTHER PUBLICATIONS

International Search Report and Written Opinion in PCT Application No. PCT/US2023/028796, issued Oct. 19, 2023.
(Continued)

*Primary Examiner* — Kenneth J Hansen
*Assistant Examiner* — Kelsey L Stanek
(74) *Attorney, Agent, or Firm* — Foley & Lardner LLP

(57) ABSTRACT

A decomposition chamber for an exhaust aftertreatment system includes an inlet conduit centered on an inlet conduit axis and configured to receive exhaust, a decomposition conduit coupled to the inlet conduit, an endcap coupled to the decomposition conduit, and an injector coupled to the endcap and configured to provide reductant into the decomposition conduit along an injection axis. The decomposition chamber includes a guide swirl mixer coupled to at least one of the inlet conduit or the endcap. The guide swirl mixer includes a first portion disposed within the inlet conduit, and a second portion disposed within the decomposition conduit such that the inlet conduit axis extends through the second portion. The second portion extends at least partially around the injection axis.

20 Claims, 29 Drawing Sheets

(51) Int. Cl.
  *B01F 23/213* (2022.01)
  *B01F 25/313* (2022.01)
  *B01F 25/431* (2022.01)
  *F01N 3/28* (2006.01)

(52) U.S. Cl.
  CPC ...... *B01F 23/2132* (2022.01); *B01F 25/3131* (2022.01); *B01F 25/431* (2022.01); *F01N 3/2892* (2013.01); *F01N 2610/02* (2013.01); *F01N 2610/1453* (2013.01)

(58) Field of Classification Search
  CPC ........ F01N 3/021; F01N 3/0842; F01N 3/106; F01N 3/24; F01N 1/086; F01N 2240/20; B01F 25/3131; B01F 25/431; B01F 23/2132; B01F 2101/25; B01F 23/213; B01F 23/4315; B01F 25/431974; B01D 53/9418; B01D 53/9431
  USPC .......................................................... 422/176
  See application file for complete search history.

(56) References Cited

U.S. PATENT DOCUMENTS

| | | | |
|---|---|---|---|
| 9,352,276 | B2 | 5/2016 | Sampath |
| 9,410,464 | B2 | 8/2016 | Hicks et al. |
| 9,849,424 | B2 | 12/2017 | Davidson et al. |
| 9,982,584 | B2 * | 5/2018 | Püschel ................ B01F 25/102 |
| 10,247,081 | B2 | 4/2019 | Niaz |
| 10,273,853 | B2 | 4/2019 | Golin |
| 10,422,268 | B2 | 9/2019 | Niaz |
| 10,583,393 | B2 | 3/2020 | Valentine et al. |
| 10,612,443 | B2 | 4/2020 | Li et al. |
| 10,787,946 | B2 | 9/2020 | Rohde et al. |
| 10,920,635 | B2 | 2/2021 | Kozakiewicz |
| 10,933,387 | B2 | 3/2021 | Cvelbar |
| 11,193,412 | B2 | 12/2021 | Cvelbar et al. |
| 11,293,328 | B2 | 4/2022 | Cvelbar et al. |
| 11,459,929 | B2 | 10/2022 | Dimpelfeld et al. |
| 2009/0165447 | A1 | 7/2009 | Hiranuma et al. |
| 2009/0180937 | A1 | 7/2009 | Nohl et al. |
| 2010/0146942 | A1 | 6/2010 | Mayr et al. |
| 2010/0319329 | A1 | 12/2010 | Khadiya |
| 2013/0167516 | A1 | 7/2013 | Loman |
| 2016/0129397 | A1 | 5/2016 | Lee et al. |
| 2018/0078912 | A1 | 3/2018 | Yadav et al. |
| 2020/0206700 | A1 | 7/2020 | Seal et al. |
| 2020/0376450 | A1 | 12/2020 | Poinsot et al. |
| 2021/0039056 | A1 | 2/2021 | De Rudder et al. |
| 2021/0095588 | A1 | 4/2021 | Gandikota et al. |
| 2021/0270174 | A1 | 9/2021 | Volmerding et al. |
| 2021/0285356 | A1 | 9/2021 | Tan et al. |
| 2021/0301710 | A1 | 9/2021 | Cvelbar et al. |
| 2021/0308635 | A1 | 10/2021 | Mayer et al. |
| 2021/0348538 | A1 | 11/2021 | Aru et al. |
| 2021/0404367 | A1 * | 12/2021 | Alano .................. F01N 3/2066 |
| 2022/0090531 | A1 | 3/2022 | Cvelbar et al. |
| 2022/0162974 | A1 | 5/2022 | Cvelbar et al. |
| 2022/0162975 | A1 | 5/2022 | Cvelbar et al. |
| 2022/0162976 | A1 | 5/2022 | Alano et al. |
| 2022/0178293 | A1 * | 6/2022 | Lu ........................ B01D 53/944 |
| 2022/0184567 | A1 | 6/2022 | Geant |

FOREIGN PATENT DOCUMENTS

| | | |
|---|---|---|
| CN | 208106533 U | 11/2018 |
| CN | 210195855 U | 3/2020 |
| CN | 210686097 U | 6/2020 |
| CN | 210829445 U | 6/2020 |
| CN | 210858886 U | 6/2020 |
| CN | 211082028 U | 7/2020 |
| CN | 211116205 U | 7/2020 |
| CN | 211314342 U | 8/2020 |
| CN | 211397693 U | 9/2020 |
| CN | 211573625 U | 9/2020 |
| CN | 211737255 U | 10/2020 |
| CN | 212130586 U | 12/2020 |
| CN | 212130587 U | 12/2020 |
| CN | 112196645 A | 1/2021 |
| CN | 112282900 A | 1/2021 |
| CN | 212671904 U | 3/2021 |
| CN | 214836650 U | 11/2021 |
| CN | 214887318 U | 11/2021 |
| CN | 215109110 U | 12/2021 |
| CN | 215292631 U | 12/2021 |
| CN | 215486219 U | 1/2022 |
| CN | 216617626 U | 5/2022 |
| CN | 217872989 U | 11/2022 |
| FR | 2290580 A1 | 6/1976 |
| FR | 3102684 B1 | 11/2021 |
| FR | 3102683 B1 | 6/2022 |
| GB | 2 539 711 A | 12/2016 |
| WO | WO-2018/040300 A1 | 3/2018 |
| WO | WO-2020/009694 A1 | 1/2020 |

OTHER PUBLICATIONS

Proventia, Improved SCR Performance with Effective Urea Mixing, https://www.proventia.com/emission_control/oem_emission_control_non-road/eat_systems_technologies/scr_and_urea_mixing (last accessed Mar. 22, 2022).

Proventia, Droplets trajectories and velocities inside Proventia Tornado mixer, Nov. 12, 2019, https://www.youtube.com/watch?v=qMViqu8RYPs (last accessed Mar. 22, 2022).

* cited by examiner

DECOMPOSITION CHAMBER WITH GUIDE SWIRL MIXER

CROSS-REFERENCE TO RELATED PATENT APPLICATION

The present application claims the benefit of Indian Provisional Patent Application No. 202141029362, filed Jun. 30, 2021, the entire disclosure of which is incorporated herein by reference.

TECHNICAL FIELD

The present application relates generally to decomposition chambers for an exhaust aftertreatment system of an internal combustion engine.

BACKGROUND

For internal combustion engines, such as diesel engines, nitrogen oxide ($NO_x$) compounds may be emitted in exhaust. It may be desirable to reduce $NO_x$ emissions to comply with environmental regulations, for example. To reduce $NO_x$ emissions, a reductant may be dosed into the exhaust by a dosing system and within an aftertreatment system. The reductant facilitates conversion of a portion of the exhaust into non-$NO_x$ emissions, such as nitrogen ($N_2$), carbon dioxide ($CO_2$), and water ($H_2O$), thereby reducing $NO_x$ emissions.

The exhaust and reductant react within a component of the aftertreatment system. This component is typically configured to attain a specific conversion of the exhaust into non-$NO_x$ emissions. However, this configuration typically decreases performance and efficiency of the aftertreatment system. For example, this configuration may cause an increase in back pressure on an internal combustion engine which can cause decreased efficiency of the internal combustion engine.

SUMMARY

In one embodiment, a decomposition chamber for an exhaust aftertreatment system includes an inlet conduit centered on an inlet conduit axis and configured to receive exhaust, a decomposition conduit coupled to the inlet conduit, an endcap coupled to the decomposition conduit, and an injector coupled to the endcap and configured to provide reductant into the decomposition conduit along an injection axis. The decomposition chamber includes a guide swirl mixer coupled to at least one of the inlet conduit or the endcap. The guide swirl mixer includes a first portion disposed within the inlet conduit, and a second portion disposed within the decomposition conduit such that the inlet conduit axis extends through the second portion. The second portion extends at least partially around the injection axis.

In another embodiment, a decomposition chamber for an exhaust aftertreatment system includes a decomposition conduit, an endcap, an injector, and a guide swirl mixer. The endcap is coupled to the decomposition conduit. The injector is coupled to the endcap and configured to provide reductant into the decomposition conduit along an injection axis. The guide swirl mixer is coupled to the endcap such that at least a portion of the guide swirl mixer extends partially around the injection axis, the guide swirl mixer comprising a slot contiguous with the endcap. The slot is configured to facilitate flow of exhaust through the guide swirl mixer.

In yet another embodiment, a decomposition chamber for an exhaust aftertreatment system includes a decomposition conduit, an endcap, an injector, and a guide swirl mixer. The endcap is coupled to the decomposition conduit. The injector is coupled to the endcap and configured to provide reductant into the decomposition conduit along an injection axis. The guide swirl mixer is coupled to the endcap such that at least a portion of the guide swirl mixer extends partially around the injection axis. The guide swirl mixer includes a window separated from the endcap by a portion of the guide swirl mixer, the window configured to facilitate flow of exhaust through the guide swirl mixer.

In yet another embodiment, a decomposition chamber for an exhaust aftertreatment system includes a decomposition conduit, an endcap, an injector, and a guide swirl mixer. The endcap is coupled to the decomposition conduit. The injector is coupled to the endcap and configured to provide reductant into the decomposition conduit along an injection axis. The guide swirl mixer is coupled to the endcap such that at least a portion of the guide swirl mixer extends partially around the injection axis. The guide swirl mixer includes a radial lip extending along a downstream edge of the guide swirl mixer, at least a portion of the radial lip extending partially around the injection axis, the radial lip extending radially outward and away from the injection axis.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
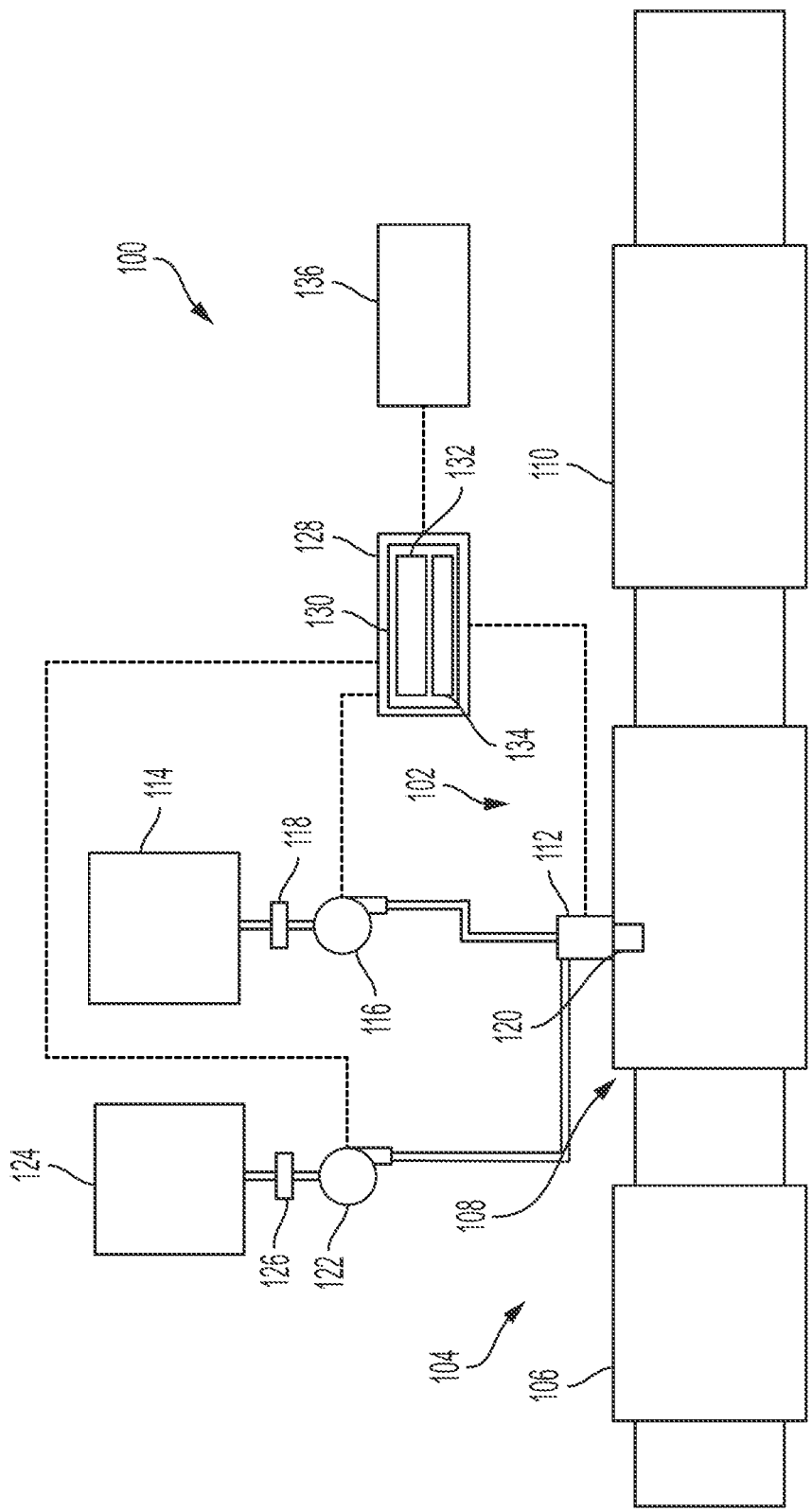
FIG. 1 is a block schematic diagram of an example aftertreatment system.

Following below are more detailed descriptions of various concepts related to, and implementations of, methods, apparatuses, and for decomposing constituents of exhaust in an exhaust aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust that contains constituents, such as NOR, Na, $CO_2$, and/or $H_2O$. In some applications, an exhaust aftertreatment system is utilized to dose the exhaust with a reductant so as to reduce NOR emissions in the exhaust. These exhaust aftertreatment systems may include a decomposition chamber within which the reductant is provided and mixed with the exhaust.

Enhancing mixing of the reductant and exhaust can increase desirability of an exhaust aftertreatment system. However, enhancing mixing of the reductant and exhaust can lead to increasing the backpressure of the decomposition chamber (e.g., on an internal combustion engine having the exhaust aftertreatment system, etc.), thereby decreasing desirability of the exhaust aftertreatment system (e.g., because performance of the internal combustion engine is negatively impacted by the increased backpressure, etc.). Additionally, the reductant may form deposits within the exhaust aftertreatment system, such as on internal surfaces of the decomposition chamber, which can decrease desirability of the decomposition chamber because the backpressure of the decomposition chamber is increased, and/or because NOR emissions cannot be desirably reduced.

Current systems include an inlet downpipe and a horizontal decomposition chamber, such that exhaust from the inlet downpipe enters the decomposition chamber through a tangential interface. However, this configuration causes the exhaust to flow to the outer diameter of the decomposition chamber, which leads to a cyclonic vortex being generated across the length of the decomposition chamber.

It thus is desirable to interface the inlet pipe with the decomposition chamber along a centerline of the decomposition chamber rather than tangentially. An internal guide swirl mixer is provided along an internal surface to provide additional downstream mixing. For instance, the decomposition chamber includes an inlet conduit (e.g., the inlet downpipe) centered on an inlet conduit axis configured to receive exhaust and coupled to a decomposition conduit (e.g., the horizontal decomposition chamber). An endcap may be coupled to the decomposition conduit, and an injector coupled to the endcap to provide reductant into the decomposition conduit along an injection axis. The guide swirl mixer may be coupled to at least one of the inlet conduit or the endcap. The guide swirl mixer includes a first portion disposed within the inlet conduit, and a second portion disposed within the decomposition conduit such that the inlet conduit axis extends through the second portion. The second portion extends at least partially around the injection axis. For instance, the guide swirl mixer may be a "C" shaped plate. In some embodiments, the swirl mixer may be a "J" shaped plate. These configurations cause the exhaust to swirl within the decomposition conduit and creates a low pressure region within the decomposition conduit so as to facilitate desirable mixing of the exhaust and the reductant upstream of the SCR catalyst member when the reductant is provided into the low pressure region. The decomposition chamber is thus thermally efficient, compact, and lightweight, with low back pressure, low deposit, and high $NO_x$ performance.

II. Example Exhaust Aftertreatment System

FIG. 1 depicts an exhaust aftertreatment system 100 having an example reductant delivery system 102 for an exhaust conduit system 104 (e.g., pipe system, tube system, etc.). The exhaust aftertreatment system 100 includes the reductant delivery system 102, a particulate filter (e.g., a diesel particulate filter (DPF), etc.) 106, a decomposition chamber 108 (e.g., decomposition reactor, reactor pipe, decomposition tube, reactor tube, etc.), and a selective catalytic reduction (SCR) catalyst member 110.

The particulate filter 106 is configured to remove particulate matter, such as soot, from exhaust flowing in the exhaust conduit system 104. The particulate filter 106 includes an inlet, where the exhaust is received, and an outlet, where the exhaust exits after having particulate matter substantially filtered from the exhaust and/or converting the particulate matter into carbon dioxide. In some implementations, the particulate filter 106 may be omitted.

The decomposition chamber 108 is configured to convert a reductant into ammonia. The reductant may be, for example, urea, diesel exhaust fluid (DEF), Adblue®, a urea water solution (UWS), an aqueous urea solution (e.g., AUS32, etc.), and other similar fluids. The decomposition chamber 108 includes an inlet fluidly coupled to (e.g., fluidly configured to communicate with, etc.) the particulate filter 106 to receive the exhaust containing $NO_x$ emissions and an outlet for the exhaust, $NO_x$ emissions, ammonia, and/or reductant to flow to the SCR catalyst member 110.

The reductant delivery system 102 includes a dosing module 112 (e.g., doser, etc.) configured to dose the reductant into the decomposition chamber 108 (e.g., via an injector). The dosing module 112 is mounted to the decomposition chamber 108 such that the dosing module 112 may dose the reductant into the exhaust flowing in the exhaust conduit system 104. The dosing module 112 may include an insulator interposed between a portion of the dosing module 112 and the portion of the decomposition chamber 108 on which the dosing module 112 is mounted.

The dosing module 112 is fluidly coupled to a reductant source 114. The reductant source 114 may include multiple reductant sources 114. The reductant source 114 may be, for example, a diesel exhaust fluid tank containing Adblue®. A reductant pump 116 (e.g., supply unit, etc.) is used to pressurize the reductant from the reductant source 114 for delivery to the dosing module 112. In some embodiments, the reductant pump 116 is pressure controlled (e.g., controlled to obtain a target pressure, etc.). The reductant pump 116 includes a reductant filter 118. The reductant filter 118 filters (e.g., strains, etc.) the reductant prior to the reductant being provided to internal components (e.g., pistons, vanes, etc.) of the reductant pump 116. For example, the reductant filter 118 may inhibit or prevent the transmission of solids (e.g., solidified reductant, contaminants, etc.) to the internal components of the reductant pump 116. In this way, the reductant filter 118 may facilitate (e.g., allow, permit, etc.) prolonged desirable operation of the reductant pump 116. In some embodiments, the reductant pump 116 is coupled to (e.g., attached to, fixed to, welded to, integrated with, etc.) a chassis of a vehicle associated with the exhaust aftertreatment system 100.

The dosing module 112 includes at least one injector 120. Each injector 120 is configured to dose the reductant into the exhaust (e.g., within the decomposition chamber 108, etc.). In some embodiments, the reductant delivery system 102 also includes an air pump 122. In these embodiments, the air pump 122 draws air from an air source 124 (e.g., air intake, etc.) and through an air filter 126 disposed upstream of the air pump 122. Additionally, the air pump 122 provides the air to the dosing module 112 via a conduit. In these embodiments, the dosing module 112 is configured to mix the air and the reductant into an air-reductant mixture and to provide the air-reductant mixture into the decomposition chamber 108. In other embodiments, the reductant delivery system 102 does not include the air pump 122 or the air source 124. In such embodiments, the dosing module 112 is not configured to mix the reductant with air.

The dosing module 112 and the reductant pump 116 are also electrically or communicatively coupled to a reductant delivery system controller 128. The reductant delivery system controller 128 is configured to control the dosing module 112 to dose the reductant into the decomposition chamber 108. The reductant delivery system controller 128 may also be configured to control the reductant pump 116.

The reductant delivery system controller 128 includes a processing circuit 130. The processing circuit 130 includes a processor 132 and a memory 134. The processor 132 may include a microprocessor, an application-specific integrated circuit (ASIC), a field-programmable gate array (FPGA), etc., or combinations thereof. The memory 134 may include, but is not limited to, electronic, optical, magnetic, or any other storage or transmission device capable of providing a processor, ASIC, FPGA, etc. with program instructions. This memory 134 may include a memory chip, Electrically Erasable Programmable Read-Only Memory (EEPROM), Erasable Programmable Read Only Memory (EPROM), flash memory, or any other suitable memory from which the reductant delivery system controller 128 can read instructions. The instructions may include code from any suitable programming language. The memory 134 may include various modules that include instructions which are configured to be implemented by the processor 132.

In various embodiments, the reductant delivery system controller 128 is configured to communicate with a central controller 136 (e.g., engine control unit (ECU)), engine control module (ECM), etc.) of an internal combustion engine having the exhaust aftertreatment system 100. In some embodiments, the central controller 136 and the reductant delivery system controller 128 are integrated into a single controller.

In some embodiments, the central controller 136 is communicable with a display device (e.g., screen, monitor, touch screen, heads up display (HUD), indicator light, etc.). The display device may be configured to change state in response to receiving information from the central controller 136. For example, the display device may be configured to change between a static state (e.g., displaying a green light, displaying a "SYSTEM OK" message, etc.) and an alarm state (e.g., displaying a blinking red light, displaying a "SERVICE NEEDED" message, etc.) based on a communication from the central controller 136. By changing state, the display device may provide an indication to a user (e.g., operator, etc.) of a status (e.g., operation, in need of service, etc.) of the reductant delivery system 102.

The decomposition chamber 108 is located upstream of the SCR catalyst member 110. As a result, the reductant is injected by the injector 120 upstream of the SCR catalyst member 110 such that the SCR catalyst member 110 receives a mixture of the reductant and exhaust. The reductant droplets undergo the processes of evaporation, thermolysis, and hydrolysis to form non-$NO_x$ emissions (e.g., gaseous ammonia, etc.) within the decomposition chamber 108 and/or the exhaust conduit system 104.

The SCR catalyst member 110 is configured to assist in the reduction of $NO_x$ emissions by accelerating a $NO_x$ reduction process between the reductant and the $NO_x$ of the exhaust into diatomic nitrogen, water, and/or carbon dioxide. The SCR catalyst member 110 includes an inlet fluidly coupled to the decomposition chamber 108 from which exhaust and reductant are received and an outlet fluidly coupled to an end of the exhaust conduit system 104.

The exhaust aftertreatment system 100 may further include an oxidation catalyst (e.g., a diesel oxidation catalyst (DOC)) fluidly coupled to the exhaust conduit system 104 (e.g., downstream of the SCR catalyst member 110 or upstream of the particulate filter 106) to oxidize hydrocarbons and carbon monoxide in the exhaust.

In some implementations, the particulate filter 106 may be positioned downstream of the decomposition chamber 108. For instance, the particulate filter 106 and the SCR catalyst member 110 may be combined into a single unit. In some implementations, the dosing module 112 may instead be positioned downstream of a turbocharger or upstream of a turbocharger.

While the exhaust aftertreatment system 100 has been shown and described in the context of use with a diesel internal combustion engine, it is understood that the exhaust aftertreatment system 100 may be used with other internal combustion engines, such as gasoline internal combustion engines, hybrid internal combustion engines, propane internal combustion engines, and other similar internal combustion engines.

III. Example Decomposition Chamber with Guide Swirl Mixer

FIGS. 2-9, 32, and 34 illustrate the decomposition chamber 108 according to an example embodiment. The decomposition chamber 108 includes an inlet assembly 200 (e.g., mixing assembly, etc.). As is described in more detail herein, the inlet assembly 200 is configured to receive the exhaust and to facilitate mixing of the exhaust and the reductant.

Figure 32:
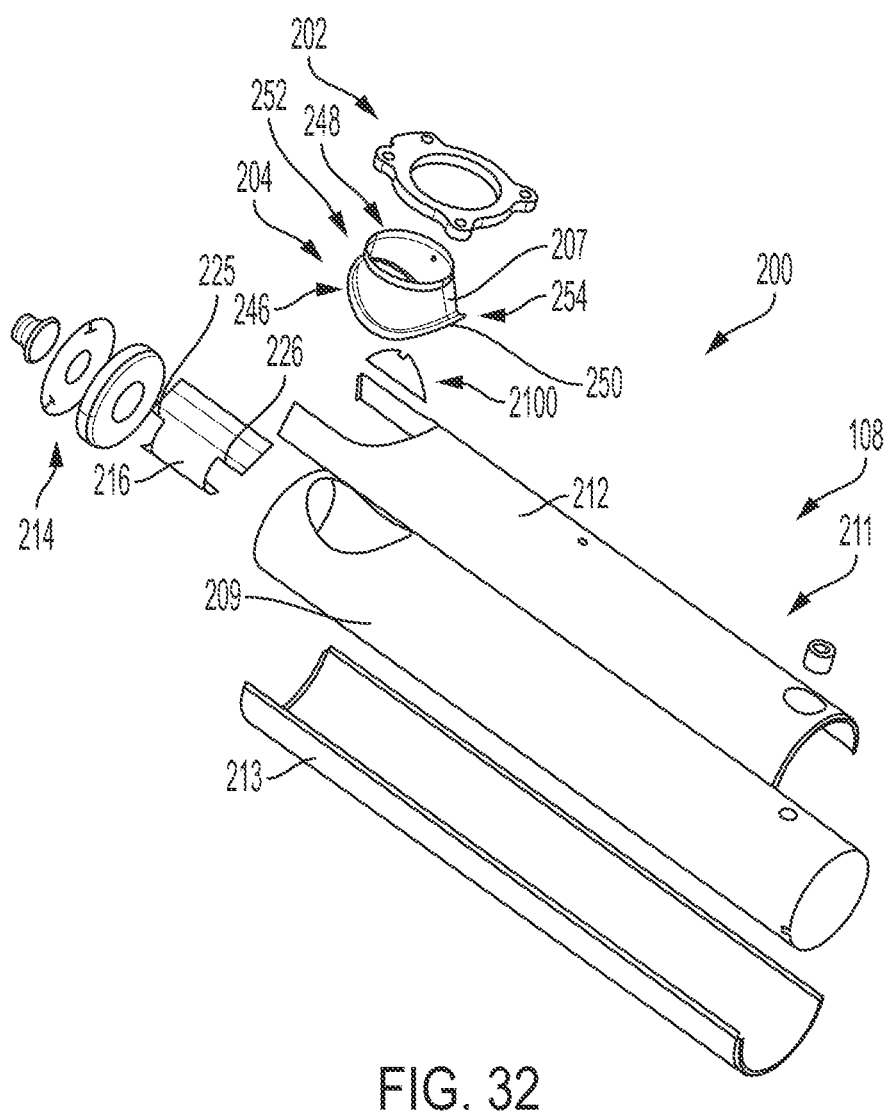
FIG. 32 is an exploded view of the decomposition chamber shown in FIG. 2.
Figure 34:
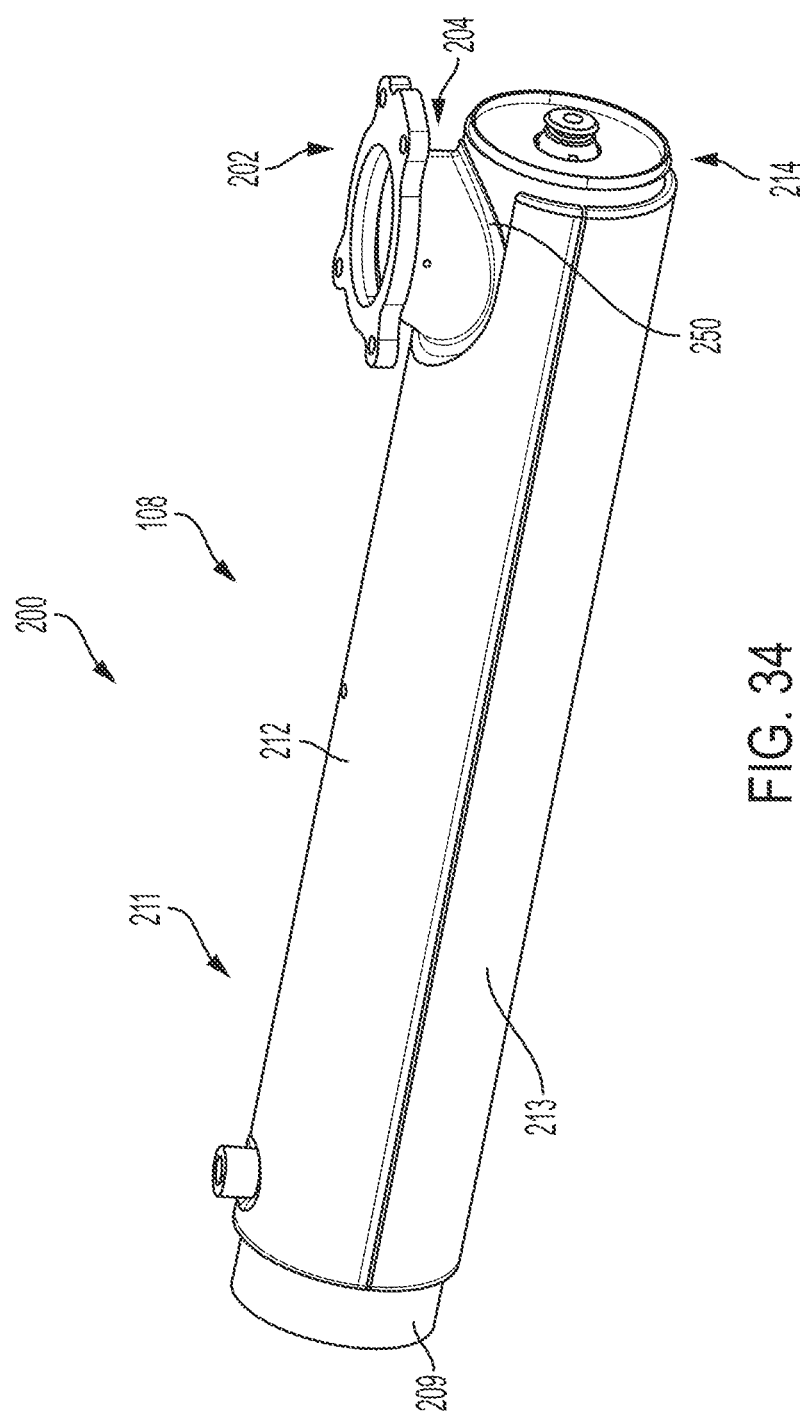
FIG. 34 is a perspective view of the decomposition chamber shown in FIG. 2.

The inlet assembly 200 includes an inlet fitting 202 (e.g., connector, coupling, etc.). The inlet fitting 202 is configured to receive the exhaust from a portion of the exhaust conduit system 104 that is upstream of the decomposition chamber 108. For example, the inlet fitting 202 may receive the exhaust after the exhaust has flowed through the particulate filter 106. The inlet fitting 202 may be coupled to, or integrally formed with, a portion of the exhaust conduit system 104. In some embodiments, such as shown in FIGS. 32 and 34, the inlet fitting 202 comprises a flange that is configured to be coupled to a flange of an upstream conduit of the exhaust conduit system 104.

Figure 2:
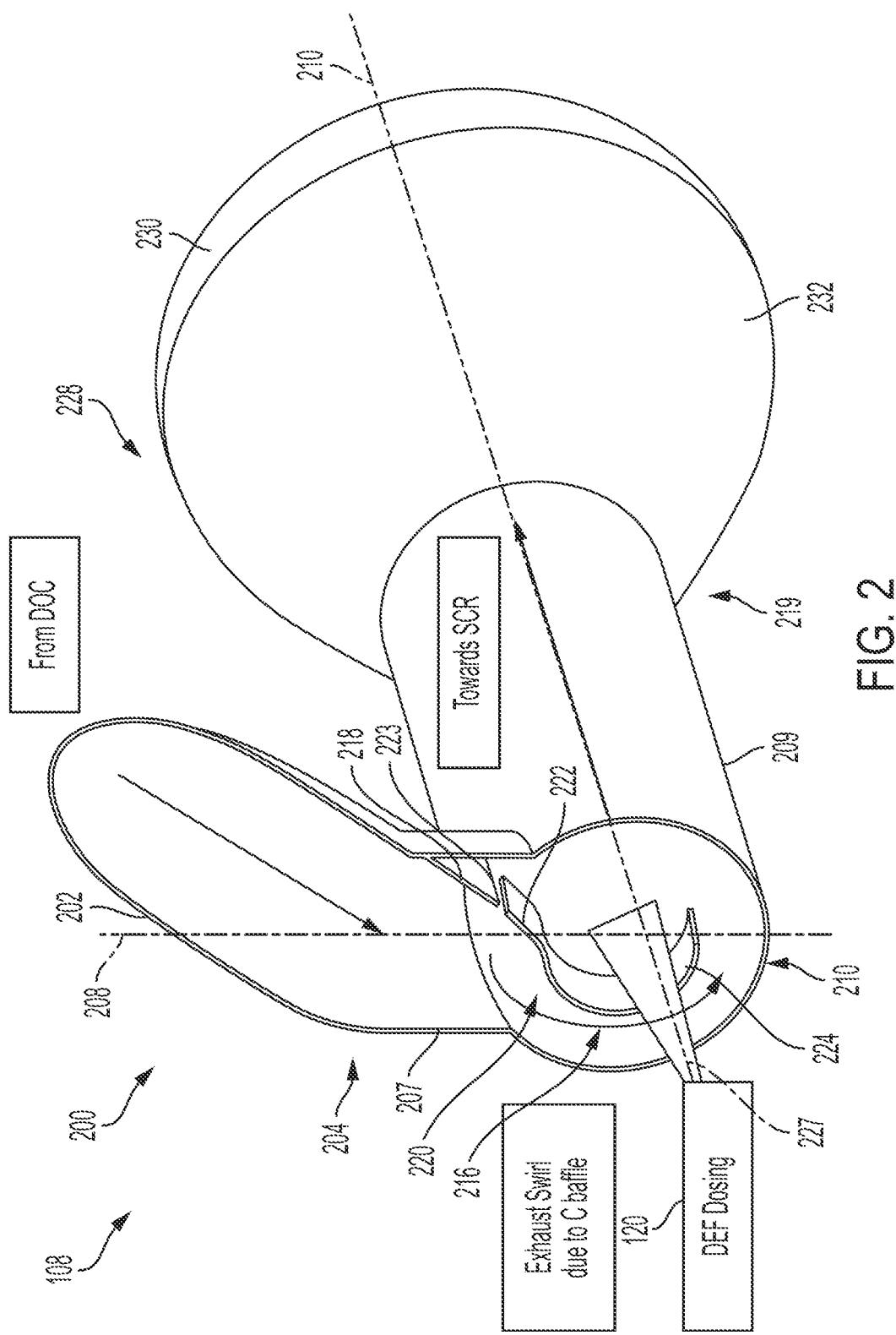
FIG. 2 is a cross-sectional view of an example decomposition chamber.

The inlet assembly 200 also includes an inlet conduit 204 (e.g., pipe, tube, etc.). The inlet conduit 204 is coupled to or integrally formed with the inlet fitting 202. The inlet conduit 204 is fluidly coupled to the inlet fitting 202 and configured to receive the exhaust from the inlet fitting 202. In various embodiments, the inlet fitting 202 and the inlet conduit 204 cooperate to facilitate redirection of the exhaust from a first direction to a second direction different from the first direction. For instance, as shown in FIG. 2, the inlet fitting 202 may be angled relative to the inlet conduit 204. As a result of the change in direction between the inlet fitting 202 and the inlet conduit 204, a flow of the exhaust is caused to curve from the inlet fitting 202 to the inlet conduit 204.

The inlet conduit 204 is cylindrical in various embodiments. For example, the inlet conduit 204 may be cylindrical and have a diameter between a range, inclusively, of 30 mm-100 mm (e.g., 42 mm, 48 mm, 50 mm, 52 mm, 58 mm, 60 mm, 88.9 mm, 90 mm, 95 mm, 100 mm, etc.).

Figures 12, 13, 14:
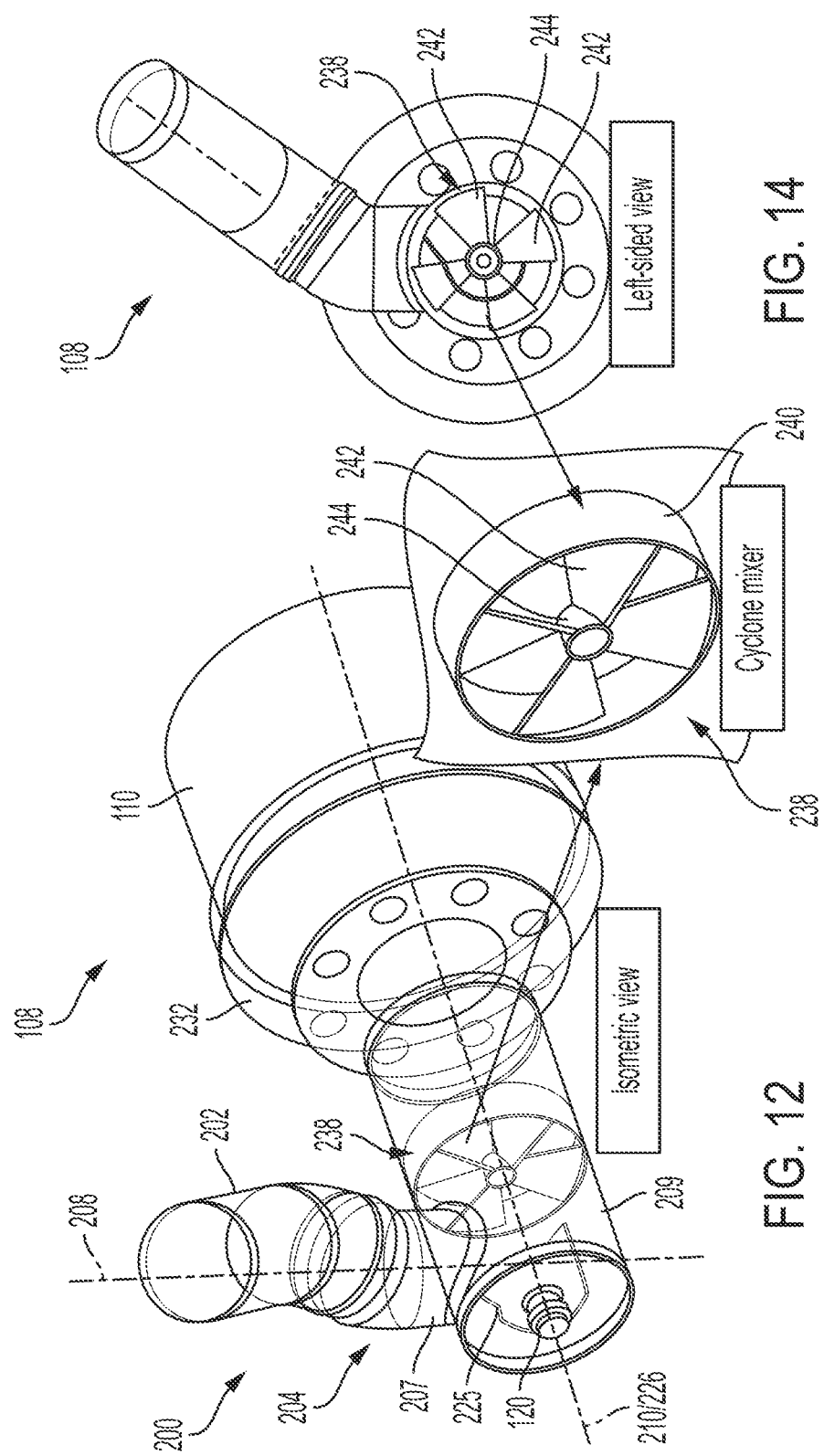
FIG. 12 is a perspective view of another example decomposition chamber with some portions shown with partial transparency.
FIG. 13 is a detailed view of a portion of the decomposition chamber shown in FIG. 12.
FIG. 14 is an end view of the decomposition chamber shown in FIG. 12 with some portions hidden.

In some embodiments, the inlet fitting 202 includes a first straight portion that is coupled to, or integrally formed with, the exhaust conduit system 104, and a curved portion that receives the exhaust from the first straight portion, and a second straight portion that receives the exhaust from the curved portion and provides the exhaust to the inlet conduit 204. In some embodiments, the inlet conduit 204 may have multiple bends creating a "twisted" pipe. For instance, the inlet conduit 204 may have a plurality of portions, each of which is angled relative to one or more adjacent portions. Each portion may be straight, curved, or a combination thereof. As shown in FIG. 12, the inlet fitting 202 includes at least a straight portion and an angled portion adjacent the straight portion.

The inlet conduit 204 includes a straight portion 207 (e.g., a straight portion). The straight portion 207 is centered on an inlet conduit axis 208 (e.g., center line, etc.). A portion of the exhaust may be directed along the inlet conduit axis 208 and/or a direction parallel to the inlet conduit axis 208. As used herein, the term "axis" describes a theoretical line extending through the centroid (e.g., center of mass, etc.) of an object. The object is centered on this axis. The object is not necessarily cylindrical (e.g., a non-cylindrical shape may be centered on an axis, etc.).

The decomposition chamber 108 also includes a decomposition conduit 209. The decomposition conduit 209 is coupled to or integrally formed with the inlet conduit 204. For example, the inlet conduit 204 is coupled to a cylindrical surface of the decomposition conduit 209 in various embodiments. The decomposition conduit 209 is fluidly coupled to the inlet conduit 204 and is configured to receive the exhaust from the inlet conduit 204. As is explained in more detail herein, the decomposition conduit 209 facilitates mixing of the exhaust and the reductant, and provision of the exhaust and reductant to the SCR catalyst member 110.

The decomposition conduit 209 is centered on a decomposition conduit axis 210 (e.g., center line, etc.). In various embodiments, the decomposition conduit axis 210 intersects the inlet conduit axis 208 and the decomposition conduit axis 210 and the inlet conduit axis 208 extend along a reference plane. As a result, the exhaust does not flow tangentially from the inlet conduit 204 into the decomposition conduit 209. Additionally, the decomposition conduit axis 210 and the inlet conduit axis 208 are separated by an angular separation α measured along the reference plane. In various embodiments, the angular separation α is approximately equal to (e.g., equal to, within 5% of being equal to, etc.) 90 degrees (°) (e.g., 85.5°, 90°, 94.5°, etc.). In some embodiments, the angular separation α may be an angle between a range, inclusively, of 70-110 degrees (°) (e.g., 75.5°, 90°, 105.5°, etc.). As a result, the exhaust may be caused to enter the decomposition conduit 209 along a direction that is approximately orthogonal to the decomposition conduit axis 210. As is explained in more detail herein, the inlet assembly 200 harnesses this redirection of the exhaust in order to enhance mixing of the exhaust and the reductant.

The decomposition conduit 209 is cylindrical in various embodiments. For example, the decomposition conduit 209 may be cylindrical and have a diameter between a range, inclusively, of 40 mm-130 mm (e.g., 58.5 mm, 70 mm, 114.3 mm, 130 mm, etc.). The decomposition conduit 209 may have a wall thickness between a range, inclusively, of 0.05 mm-3.00 mm (e.g., 1.00 mm, 1.50 mm, etc.). In various embodiments, the decomposition conduit 209 is an ovalized pipe (e.g., a pipe with an oval cross-sectional shape, etc.) or has an elliptical cross-sectional shape. In some embodiments, the decomposition conduit 209 and the inlet conduit 204 are both cylindrical and the decomposition conduit 209 has a diameter between a range, inclusively, of a product of 1.2 and the diameter of the inlet conduit 204, and a product of 1.8 and the diameter of the inlet conduit 204 (e.g., a product of 1.4 and the diameter of the inlet conduit 204, etc.).

In some embodiments, such as is shown in FIG. 32, the decomposition chamber 108 also includes a conduit cover 211 (e.g., skin, shell, etc.). The conduit cover 211 is configured to cover (e.g., overlap, encapsulate, etc.) the decomposition conduit 209. In this way, the conduit cover 211 may protect (e.g., shield, etc.) components (e.g., electrical components, sensors, tubing, etc.) surrounding the decomposition chamber 108 from heat of the exhaust flowing within the decomposition conduit 209. As shown in FIG. 32, the conduit cover 211 includes an upper cover 212 (e.g., shell, etc.) and a lower cover 213 (e.g., shell, etc.). The upper cover 212 may be coupled to the lower cover 213 around the decomposition conduit 209.

The decomposition conduit 209 includes an endcap 214 (e.g., end plate, etc.). The endcap 214 is coupled to the decomposition conduit 209 such that the decomposition conduit axis 210 extends through the endcap 214. The endcap 214 encloses the decomposition conduit 209 such that all exhaust flowing through the decomposition conduit 209 is received from the inlet conduit 204. The inlet conduit 204 does not provide the exhaust into the decomposition conduit 209 via the endcap 214. Thus, rather than receiving the exhaust axially, such as along an axis that is parallel to the decomposition conduit axis 210, the exhaust can only enter the inlet conduit 204, which is coupled to an outer surface of the decomposition conduit 209, rather than the endcap 214.

The decomposition chamber 108 also includes a guide swirl mixer 216 (e.g., plate, baffle, etc.). A first portion of the guide swirl mixer 216 is disposed within the inlet conduit 204 and a second portion of the guide swirl mixer 216 is disposed within the decomposition conduit 209. As a result, the guide swirl mixer 216 extends within both the inlet conduit 204 and the decomposition conduit 209. In various embodiments, the guide swirl mixer 216 may be constructed from steel (e.g., stainless steel, SS439, SS436L, etc.).

As is explained in more detail herein, the guide swirl mixer 216 is configured to cooperate with the inlet conduit 204 to concentrate (e.g., funnel, etc.) the exhaust prior to the exhaust being provided to the decomposition conduit 209. By concentrating the exhaust in this way, the inlet conduit 204 and the guide swirl mixer 216 may increase a velocity of the exhaust as the exhaust flows towards the decomposition conduit 209. The guide swirl mixer 216 is also configured to cooperate with the decomposition conduit 209 and the endcap 214 to cause the exhaust to concentrate the exhaust and cause the exhaust to swirl within the decomposition conduit 209. Specifically, a portion of the guide swirl mixer 216 extends along the endcap 214 and this portion cooperates with the endcap 214 and the decomposition conduit 209 to form a channel within which the exhaust flows. The portion of the guide swirl mixer 216 that extends along the endcap 214 may extend spirally along the endcap 214 or may extend along a circular arc along the endcap 214.

After the exhaust exits this channel (e.g., flows past the guide swirl mixer 216, etc.), the exhaust is imparted with a rotation within the decomposition conduit 209. As is explained in more detail herein, the exhaust aftertreatment system 100 harnesses this rotation to facilitate desirable mixing of the exhaust and the reductant upstream of the SCR catalyst member 110. For example, the exhaust is caused to swirl within the decomposition conduit 209. Additionally, the rotation creates a low pressure region within the decomposition conduit 209. As is explained in more detail herein, the reductant may be provided into this low pressure region so as to facilitate desirable mixing of the exhaust and the reductant upstream of the SCR catalyst member 110. In these ways, the guide swirl mixer 216 enables desirable mixing of the exhaust and the reductant upstream of the SCR catalyst member 110. As used herein, a "low pressure region" is a region where pressure of the exhaust is less than 50% (e.g., less than 41%, less than 40%, less than 35%, less than 25%, etc.) of a pressure of the exhaust within the inlet conduit 204.

The guide swirl mixer 216 includes a first portion 218. The first portion 218 extends into the inlet conduit 204 and may be coupled to the inlet conduit 204. The first portion 218 may be straight and angled away from a wall of the inlet conduit 204 and toward the inlet conduit axis 208.

The guide swirl mixer 216 also includes a second portion 220. The first portion 218 may be coupled to or integrally formed with the second portion 220 (e.g., the second portion 220 is contiguous with the first portion 218). The second portion 220 may be coupled to the endcap 214 and include a portion that is curved relative to the first portion 218. The first portion 218 and the second portion 220 cooperate to facilitate directing the exhaust from the straight portion 207 to the decomposition conduit 209 by the first portion 218 (e.g., a deflector).

In various embodiments, such as is shown in FIG. 2, the second portion 220 includes a straight segment 222. The straight segment 222 may be aligned with the first portion 218. For instance, the straight segment 222 may be formed as an extension of the first portion 218 and contiguous with the first portion 218, such that the straight segment 222 extends into the decomposition conduit 209.

In these embodiments, the second portion 220 also includes a curved segment 224. The curved segment 224 may be contiguous with the straight segment 222. The curved segment 224 may extend at least partially around the decomposition conduit axis 210. Thus, the guide swirl mixer 216 may form a "C" or "J" shape to generate the swirl of the exhaust within the decomposition conduit 209. In some embodiments, the plane along which the inlet conduit axis 208 and the decomposition conduit axis 210 extends insects the guide swirl mixer 216 at two locations. For example, the plane may intersect the straight segment 222 and also intersect the curved segment 224. The curved segment 224 may have various diameters in various embodiments. For instance, as shown, the curved segment 224 may for a relatively full "C" shape (i.e., generally a semicircular configuration). However, in some embodiments, a reduced diameter may be used. For instance, the curved segment 224 may have a more open configuration (i.e., generally a partial oval configuration). A reduced diameter of the curved segment 224 may reduce backpressure in the exhaust conduit system 104.

The exhaust thus flows between the curved segment 224, the decomposition conduit 209, and the endcap 214 which increases the velocity of the exhaust. This arrangement also causes the exhaust to swirl within the decomposition conduit 209 downstream of the curved segment 224. This swirl extends around a low pressure region (e.g., the swirl creates a vorticity, etc.). By variously configuring the guide swirl mixer 216 and locating the injector 120, the reductant may be injected into the low pressure region. This enables the reductant to travel further downstream within the decomposition conduit 209 prior to becoming entrained in the swirling exhaust within the decomposition conduit 209, which enhances mixing of the reductant and the exhaust.

Figure 7:
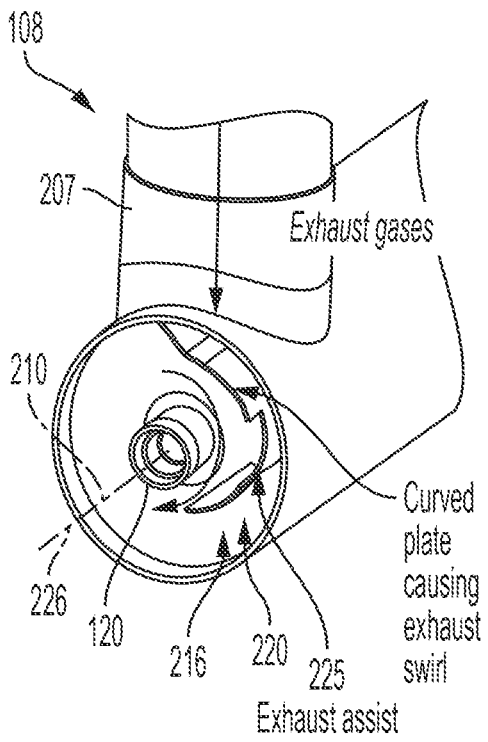
FIG. 7 is another cross-sectional view of the decomposition chamber shown in FIG. 4.
Figure 8:
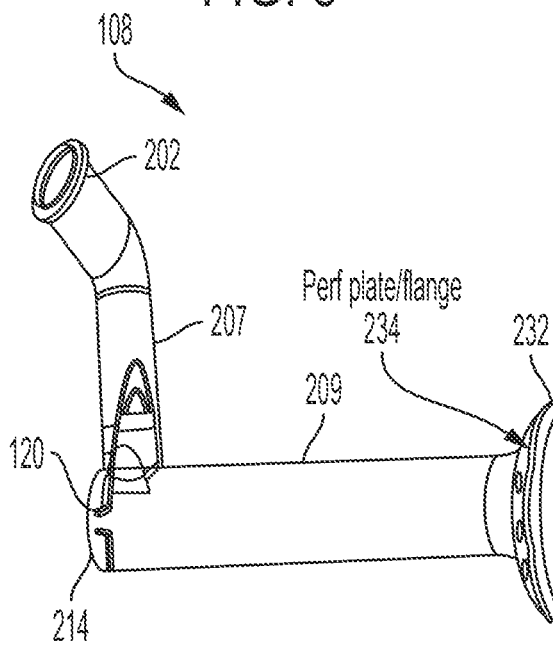
FIG. 8 is another cross-sectional view of the decomposition chamber shown in FIG. 4.
Figure 11:
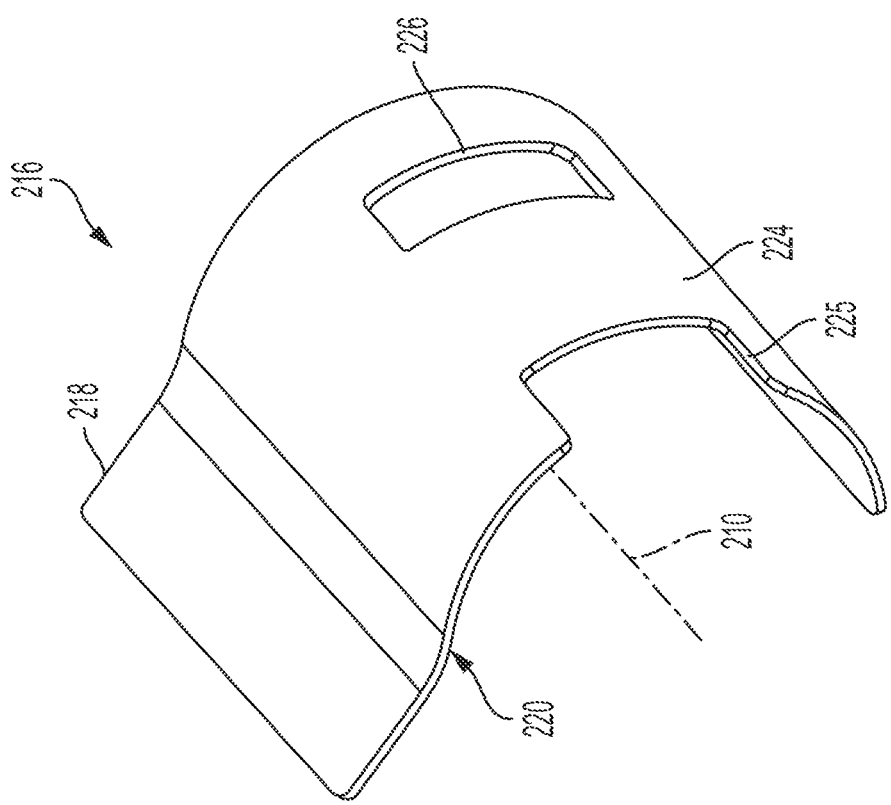
FIG. 11 is a detailed view of another portion of the decomposition chamber shown in FIG. 4.

In some embodiments, such as is shown in FIGS. 7 and 11, the guide swirl mixer 216 includes a slot 225 (e.g., aperture, window, etc.) formed in the second portion 220. The slot 225 may be disposed on the curved segment 224. The second portion 220 is located proximate the endcap 214 such that the exhaust flows between the second portion 220 and the endcap 214 via the slot 225. The slot 225 facilitates separation of a portion of the exhaust flowing within the second portion 220 from a remainder of the exhaust flowing within the second portion 220. The portion of the exhaust that flows through the slot 225 is imparted with a rotation due to the second portion 220, and this portion of the exhaust uses this rotation to swirl between the second portion 220 and the decomposition conduit 209 after flowing through the slot 225. In this way, the slot 225 provides additional swirl, and therefore facilitates additional mixing of the reductant and the exhaust.

The slot 225 functions as an exhaust assist feature which enables a portion of the exhaust to flow from between the guide swirl mixer 216 and the endcap 214, through the guide swirl mixer 216, and into the low pressure region. This portion of the exhaust assists in propelling the reductant along the injection axis into the decomposition conduit 209 and creates a second swirl of the exhaust. The second swirl extends within the low pressure region created by the first swirl of the exhaust (e.g., created by the exhaust that does not flow through the slot 225, etc.). In some embodiments, the slot 225 provides the exhaust across a tip of the injector 120. In this way, the slot 225 mitigates formation of deposits proximate the tip of the injector 120.

As shown in FIG. 11, the guide swirl mixer 216 also includes a window 226 (e.g., slot, aperture, etc.) formed in the second portion 220. The window 226 may be disposed on the curved segment 224. The window 226 is configured to facilitate passage of the exhaust through the second portion 220 independent of slot 225. In various embodiments, the window 226 is aligned with the slot 225. The window 226 facilitates separation of a portion of the exhaust flowing within the second portion 220 from a remainder of the exhaust flowing within the second portion 220. The portion of the exhaust that flows through the window 226 is imparted with a rotation due to the second portion 220, and this portion of the exhaust uses this rotation to swirl between the second portion 220 and the decomposition conduit 209 after flowing through the window 226. In this way, the window 226 provides additional swirl, and therefore facilitates additional mixing of the reductant and the exhaust. The swirl provided by the window 226 may enhance the swirl provided by the slot 225, and the swirl provided by the slot 225 may enhance the swirl provided by the window 226. By locating the window 226 at various distances from the endcap 214, the location of the swirl provided by the window 226 can be tailored for a target application. For example, the window 226 may be located at a distance from the endcap 214 that is selected based on a characteristic (e.g., spray cone geometry, etc.) of the injector 120. The window 226 decreases backpressure provided by the guide swirl mixer 216 and, similar to the slot 225, functions as an exhaust assist feature which enables a portion of the exhaust to flow through the guide swirl mixer 216 and into the low pressure region. This portion of the exhaust assists in propelling the reductant along the injection axis into the decomposition conduit 209.

Additionally, the slot 225 and/or the window 226 may function to mitigate recirculation near a tip of the injector 120 and therefore reduce deposit formation. The window 226 may be located in such a manner that a spray cone of the injector 120 (e.g., a volume within which the injector 120 sprays the reductant, etc.) does not impinge on an internal surface of the guide swirl mixer 216. As a result, the window 226 may reduce formation of deposits and provide an additional decrease in backpressure.

Figure 3:
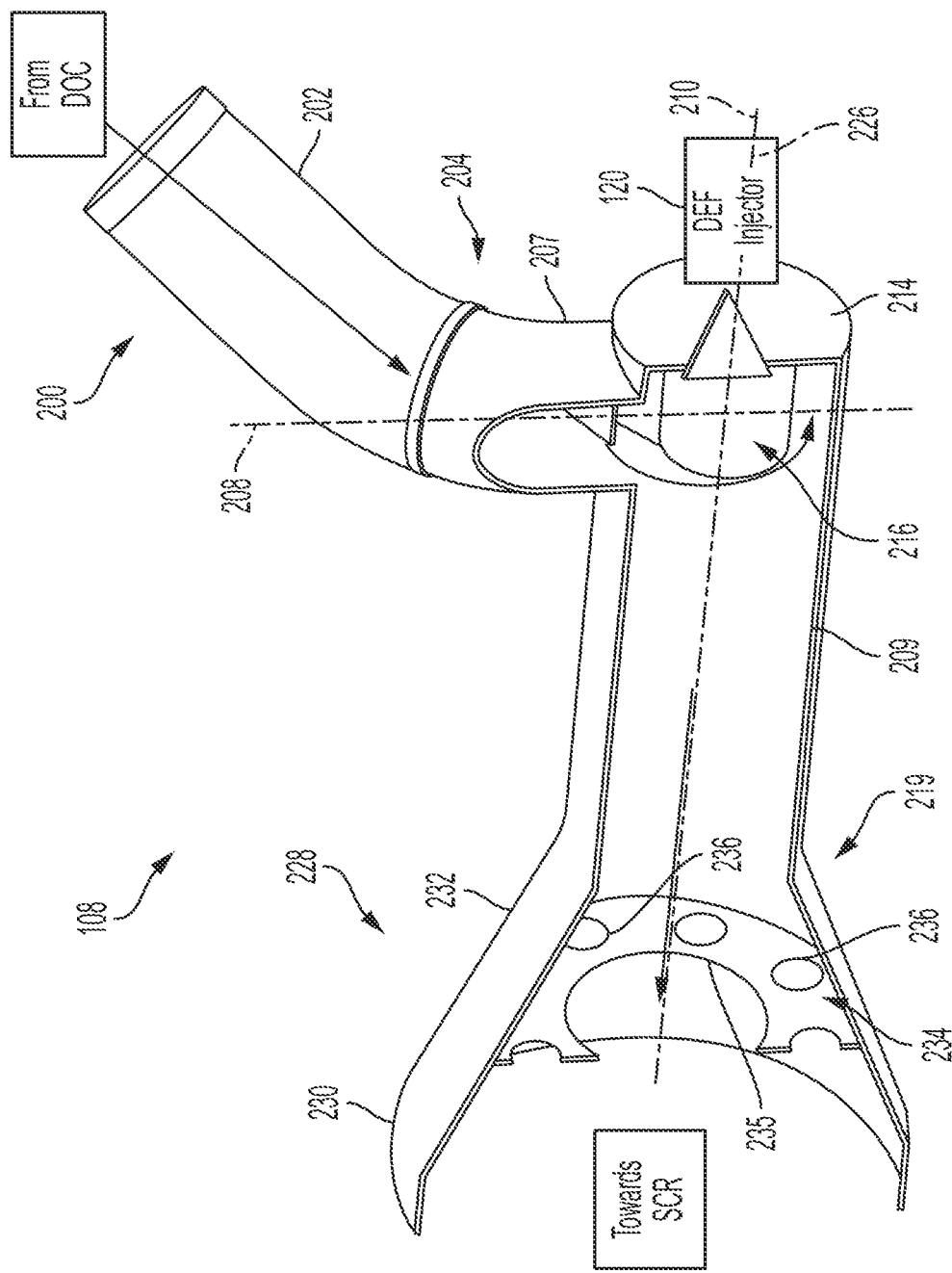
FIG. 3 is another cross-sectional view of the decomposition chamber shown in FIG. 2.

In various embodiments, such as shown in FIGS. 2 and 3, the straight segment 222 is not tangential to the curved segment 224. In other words, the straight segment 222 does not extend along a tangent of the curved segment 224. Instead, the curved segment 224 extends from the straight segment 222 so as to cause the exhaust to flow radially outwards and towards the decomposition conduit 209. This arrangement may result in further concentration of the exhaust between the curved segment 224, the decomposition conduit 209, and the endcap 214.

In some embodiments, the first portion 218 is not coupled to or integrally formed with the second portion 220. For instance, the straight segment 222 of the second portion 220 may be omitted. The second portion 220 may only include the curved segment 224.

In various embodiments, such as shown in FIG. 2, the guide swirl mixer 216 includes a gap 223. The gap 223 enables flow of the exhaust through the guide swirl mixer 216. The gap 223 facilitates separation of a portion of the exhaust from a remainder of the exhaust. The portion of the exhaust that flows through the gap 223 may not be imparted with rotation and may instead provide a sheer flow against the swirl generated by the guide swirl mixer 216. The sheer flow may mitigate flow of the exhaust from the guide swirl mixer 216 between the first portion 218 and the straight portion 207 due to the swirl generated by the guide swirl mixer 216. As a result, the gap 223 may mitigate formation of deposits between the first portion 218 and the straight portion 207. The gap 223 may be formed between the first portion 218 and the second portion 220. The gap 223 may instead be formed in the straight segment 222. In some embodiments, the gap 223 is formed between the straight segment 222 and the curved segment 224.

Figure 16:
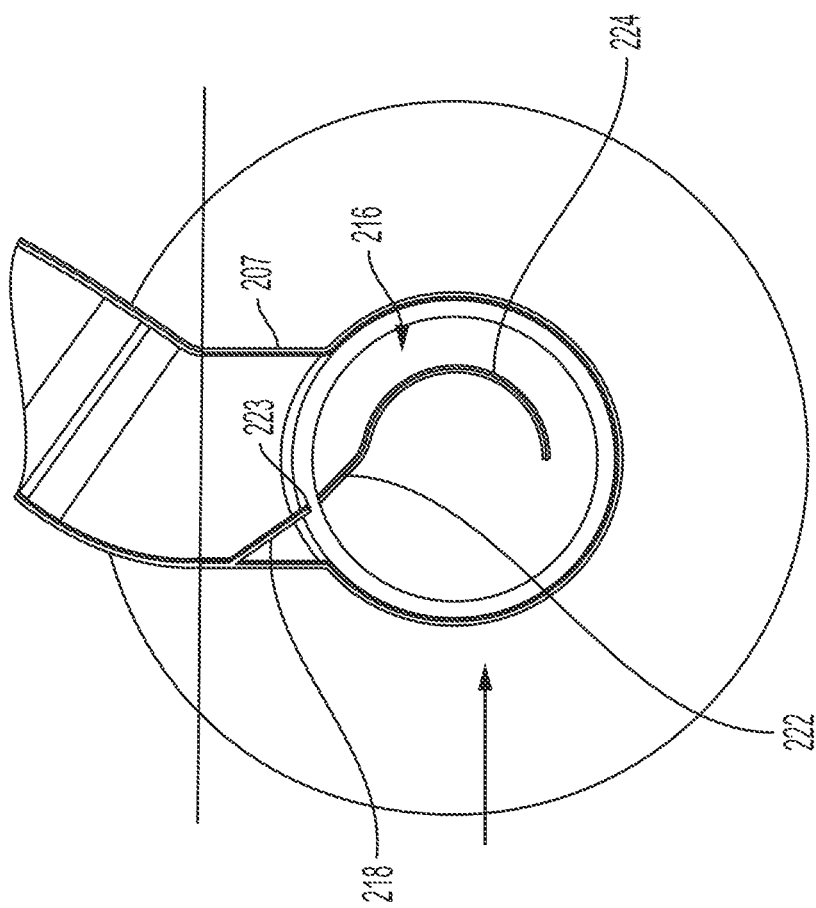
FIG. 16 is a cross-sectional view of another example decomposition chamber.

In some embodiments, the straight portion 207 may be coupled to the decomposition conduit 209 such that the inlet conduit axis 208 does not extend through the decomposition conduit axis 210. For example, the straight portion 207 may be coupled to the decomposition conduit 209 such that at least a portion of the exhaust enters the decomposition conduit 209 along a tangent of a circle that is positioned within the decomposition conduit 209 and has a center point disposed on the decomposition conduit axis 210 or an axis parallel to the decomposition conduit axis 210. The first portion 218 and the second portion 220 can be placed accordingly (e.g., the "C" shape of the guide swirl mixer 216 may be configured to swirl the exhaust either clockwise or counterclockwise, etc.). As shown in FIG. 16, the straight portion 207 and the inlet fitting 202 are angled in opposite directions than the guide swirl mixer 216, which increases the velocity of the exhaust between the guide swirl mixer 216 and the decomposition conduit 209.

In some embodiments, the guide swirl mixer 216 also includes a cap that extends between the first portion 218 or the second portion 220, and the inlet conduit 204 or the decomposition conduit 209. For example, the cap may extend from the first portion 218 to the inlet conduit 204. The cap functions to mitigate flow of the exhaust between the first portion 218 and the inlet conduit 204.

In some embodiments, the inlet conduit 204 includes a dent (e.g., projection, bump, etc.) projecting towards the first portion 218. The dent is positioned between a location where the first portion 218 and the decomposition conduit 209 and may function to mitigate flow of the exhaust between the first portion 218 and the inlet conduit 204. The dent further may be used as a location feature during the manufacturing process.

The injector 120 is disposed on the endcap 214. The injector 120 provides the reductant along an injection axis 227. The injection axis 227 extends within the decomposition conduit 206. In some embodiments, the injection axis 227 is aligned with (e.g., coincident with) the decomposition conduit axis 210. In other embodiments, the injection axis 227 is parallel to and offset from the decomposition conduit axis 210.

In one example, the injection axis 227 extends through a center point around which at least a portion of the curved segment 224 extends. For example, where a portion of the curved segment 224 extends along a circular arc, the injection axis 227 may extend through a center point of the circular arc.

At least a portion of the curved segment 224 may extend around at least a portion of a spray cone of the injector 120. As a result, the injection axis 227 extends into at least a portion of the low pressure region of the exhaust within the decomposition conduit 209. Additionally, the exhaust is caused by the guide swirl mixer 216 to swirl around the injection axis 227. The reductant is thus enabled to flow further along a length of the decomposition conduit 209, which increases mixing of the reductant within the exhaust and therefore increases a conversion efficiency of the SCR catalyst member 110.

The decomposition chamber 108 also includes an outlet assembly 228. The outlet assembly 228 receives the exhaust from an outlet end 229 of the decomposition conduit 209. The outlet assembly 228 includes an outlet fitting 230 (e.g., connector, coupling, etc.). The outlet fitting 230 is configured to receive the exhaust from the outlet end 229. The outlet fitting 230 may be coupled to, or integrally formed with, the outlet end 229. The outlet fitting 230 is configured to provide the exhaust from the outlet end 229 and into a portion of the exhaust conduit system 104 that is downstream of the decomposition chamber 108 and upstream of the SCR catalyst member 110.

The outlet assembly 228 includes a distributing cone 232. The distributing cone 232 may be coupled to or integrally formed with the outlet fitting 230. The distributing cone 232 and the outlet fitting 230 cooperate to facilitate redirection of the exhaust in a direction that is radially outward from the outlet fitting 230. In various embodiments, the distributing cone 232 is frustoconical in shape. The distributing cone 232 is positioned such that a narrower end of the distributing cone 232 is coupled to the outlet end 229.

The distributing cone 232 includes an inner surface extending from the outlet end 229 at an angle between a range, inclusively, of 30-70 degrees (e.g., 42.98 degrees, 62.93 degrees, etc.).

Figure 9:
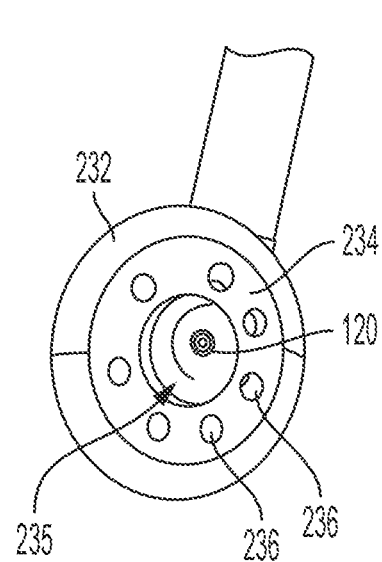
FIG. 9 is another cross-sectional view of the decomposition chamber shown in FIG. 4.
Figure 10:
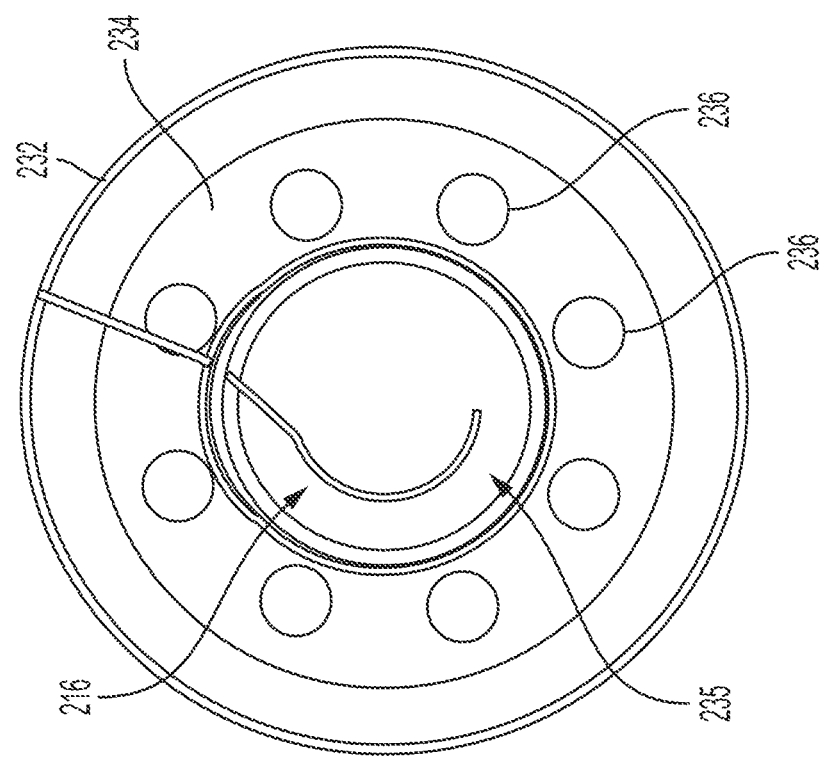
FIG. 10 is a detailed view of a portion of the decomposition chamber shown in FIG. 4.

As shown in FIGS. 3, 9, and 10, the outlet assembly 228 also includes an annular flange 234 (e.g., perforated plate, etc.). The annular flange 234 may be disposed within the distributing cone 232 and extend across the inner surface of the distributing cone 232. The annular flange 234 includes a central opening 235. The annular flange 234 surrounds the central opening 235, and the central opening 235 facilitates flow of the exhaust through the annular flange 234. In some embodiments, the decomposition conduit axis 210 extends through the central opening 235. In some embodiments, the injection axis 227 extends through the central opening 235.

In some embodiments, the central opening 235 is centered on the decomposition conduit axis 210. In some embodiments, the central opening 235 is offset from the decomposition conduit axis 210. Further, the central opening may define a central opening diameter. The central opening diameter may vary. For instance, the central opening diameter may be a diameter between a range, inclusively, of a product of 0.3 and the diameter of the decomposition conduit 209, and a product of 0.8 and the diameter of the decomposition conduit 209.

The annular flange 234 may include a plurality of apertures 236. Each of the apertures 236 is configured to facilitate flow of the exhaust through the annular flange 234. The apertures 236 may be disposed along the annular flange 234 around the central opening 235, as shown in FIG. 10. The apertures 236 may vary in number and/or diameter. The variation in the apertures 236 may correspond with the central opening diameter. For instance, a smaller central opening diameter may allow for a greater number of apertures 236 and/or larger apertures 236. In some embodiments, for example as shown, the apertures 236 include seven or either apertures 236 even spaced around the circumference of the annular flange 234 (e.g., around the outer edge of the central opening diameter). In some embodiments, the apertures 236 may include a large amount of small perforations. The apertures 236 may be circular or any suitable shape. The apertures 236 facilitate smoothing of the flow of the exhaust prior to the exhaust exiting the decomposition chamber 108.

Figure 4:
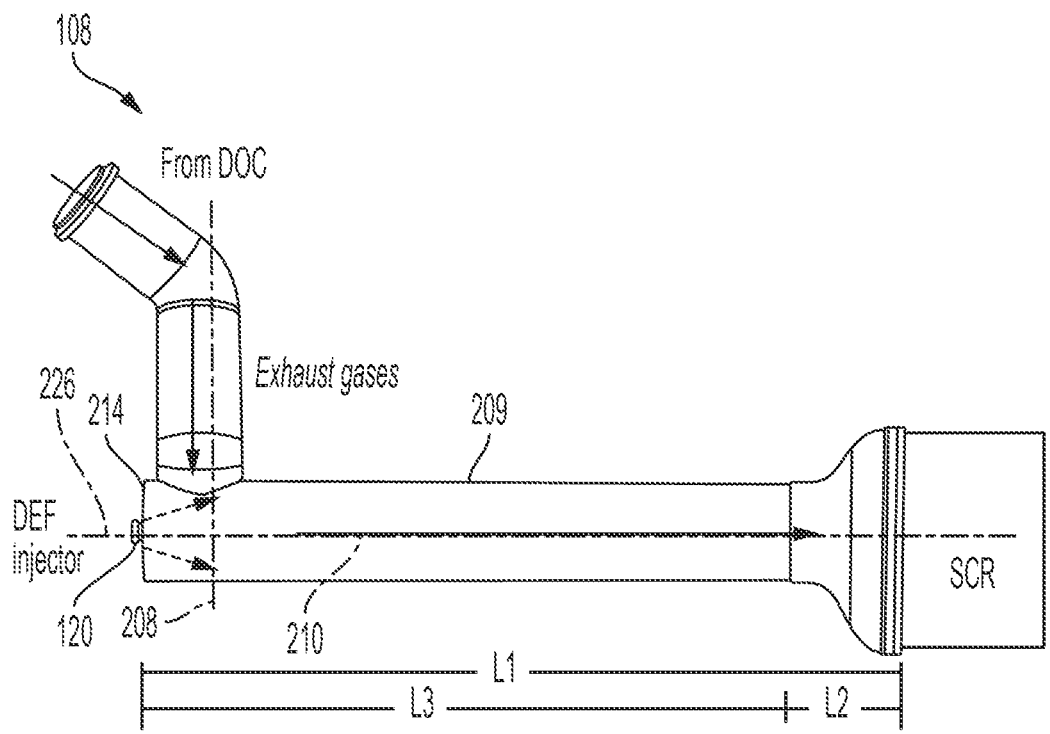
FIG. 4 is a side view of another example decomposition chamber.
Figure 5:
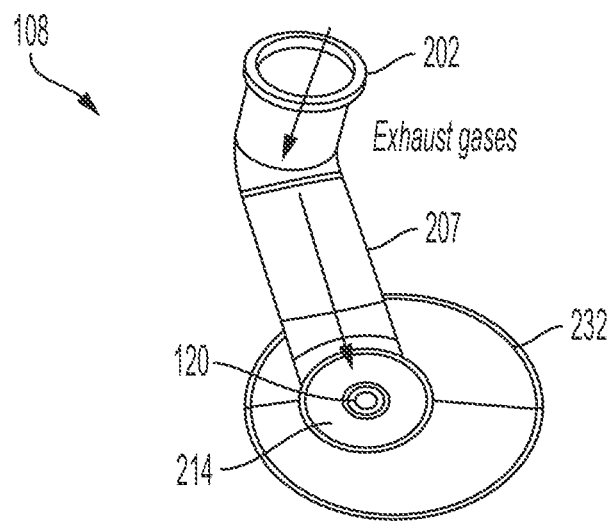
FIG. 5 is an end view of the decomposition chamber shown in FIG. 4.
Figure 6:
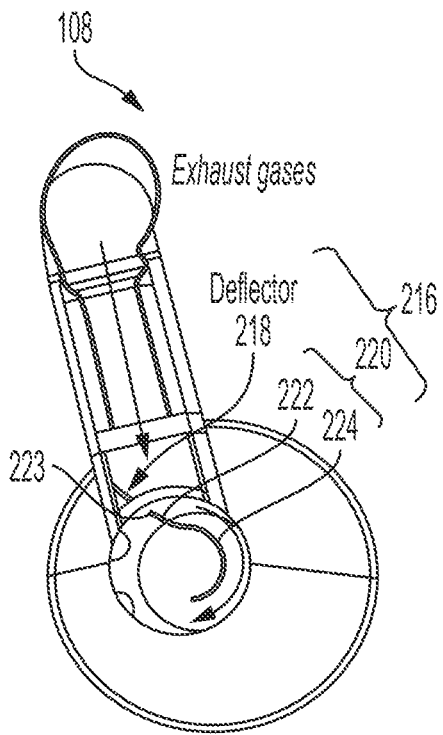
FIG. 6 is a cross-sectional view of the decomposition chamber shown in FIG. 4.

As shown in FIG. 4, the decomposition chamber 108 may have length L1. The distributing cone 232 may have a length L2 less than the length L1. Further, the decomposition conduit 209 may have a length L3, where the length L3 is equal to the length L1 less the length L2. The length L1 is, in some embodiments, between a range, inclusively, of 300-950 mm (e.g., 365 mm, 462.5 mm, 771 mm, 800 mm, 950 mm, etc.). The length L2 is, in some embodiments, between a range, inclusively, of 50-300 mm (e.g., 50 mm, 100 mm, 150 mm, 189 mm, etc.). The length L3 is, in some embodiments, between a range, inclusively, of 50 mm-800 mm (e.g., 313 mm, 700 mm, 800 mm, etc.). The injector 120 may add an additional length, in some embodiments, between a range, inclusively, of 5.0-20 mm (e.g., 10 mm, etc.).

The length L1, the length L2, and the length L3 may be variously selected such that the decomposition chamber 108 is tailored for a target application. For example, by increasing the length L3, mixing of the reductant and the exhaust may be enhanced. Furthermore, the decomposition chamber 108 may be variously configured based on the length L1, the length L2, and the length L3. For example, where the length L3 is relatively large, it may be advantageous to configure the inlet assembly 200 to include multiple bends (e.g., to form a "twisted pipe").

In one example, L1 is equal to 462.5 mm and L2 is equal to 189 mm. In another example, L1 is equal to 365 mm and L2 is equal to 150 mm. In another example, L1 is equal to 771 mm. In another example, L3 is equal to 313 mm. In various embodiments, L1 has a length between a range, inclusively, of a product of 2.3 and L2, and a product of 2.6 and L2 (e.g., a product of 2.44 and L2, etc.).

Referring now to FIGS. 12-14, the decomposition chamber 108 may also include a mixing assembly 238 (e.g., cyclone mixer, etc.). The mixing assembly 238 is disposed within the decomposition conduit 209 and is configured to facilitate swirling of the exhaust and the reductant, in addition to the swirling of the exhaust and the reductant created by the guide swirl mixer 216.

The mixing assembly 238 includes a mixing assembly body 240 (e.g., frame, etc.). The mixing assembly body 240 is coupled to the decomposition conduit 209. The mixing assembly 238 also includes a plurality of blades 242. Each of the blades 242 is coupled to the mixing assembly body 240. The mixing assembly 238 also includes a hub 244. Each of the blades 242 is coupled to the hub 244. The blades 242 are configured to facilitate swirling of the exhaust around an axis that extends through the hub 244. In some embodiments, the mixing assembly 238 may include only one blade 242, or may be a mixing assembly configured to mix without any blades.

In some embodiments, the mixing assembly 238 is configured such that the hub 244 is centered on the decomposition conduit axis 210. In some embodiments, the blades 242 are configured to facilitate swirling of the exhaust around the decomposition conduit axis 210. In some embodiments, the mixing assembly 238 is configured such that the hub 244 is centered on the injection axis 227. In some embodiments, the blades 242 are configured to facilitate swirling of the exhaust around the injection axis 227.

Figure 15:
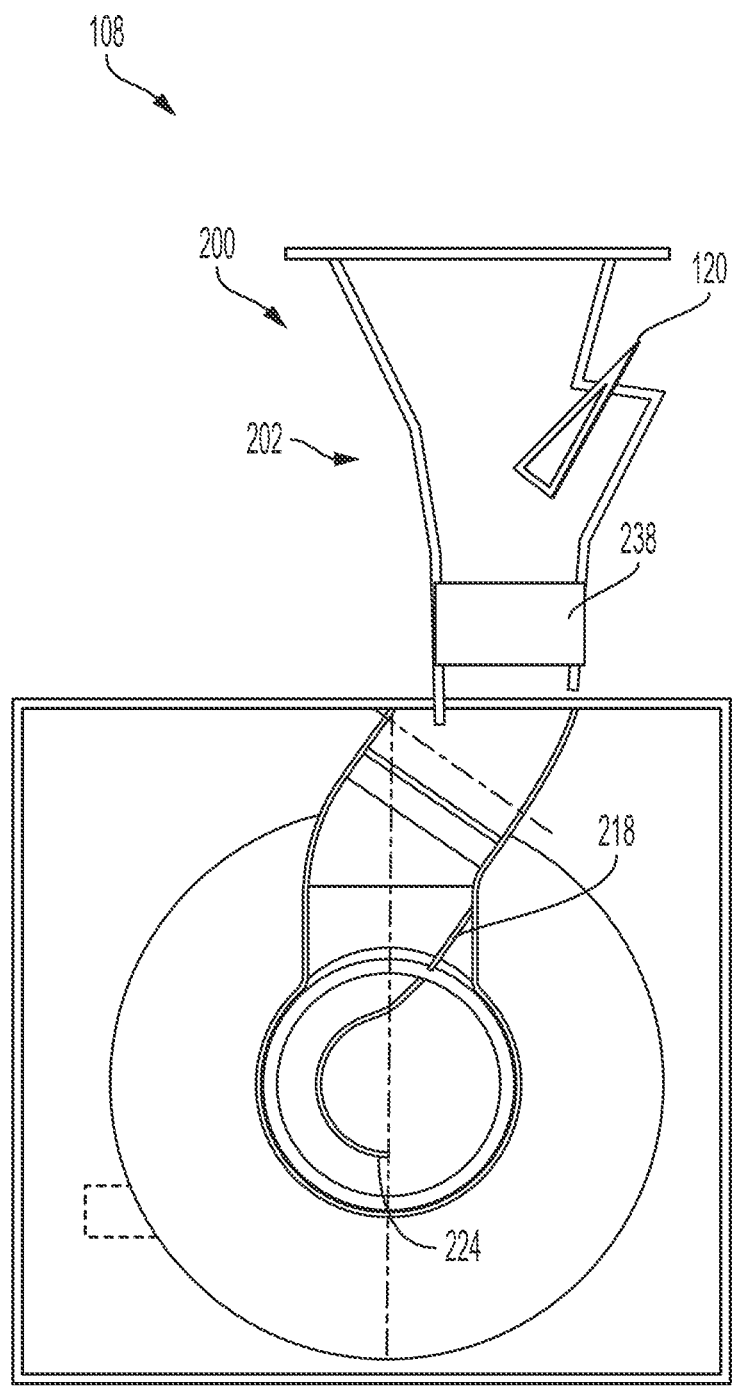
FIG. 15 is a cross-sectional view of another example decomposition chamber.

Referring now to FIG. 15, in some embodiments, the injector 120 may also may disposed along the inlet assembly 200. Particularly, the injector 120 may be coupled to an inner surface of the inlet fitting 202. In some embodiments, the mixing assembly 238 may also be included in the inlet fitting 202. For instance, the mixing assembly 238 may be located downstream the injector 120 and upstream of the guide swirl mixer 216. In some embodiments, it may be desirable to omit the mixing assembly 238 to keep the internal volume of the decomposition chamber 108 free from obstruction.

Figure 17:
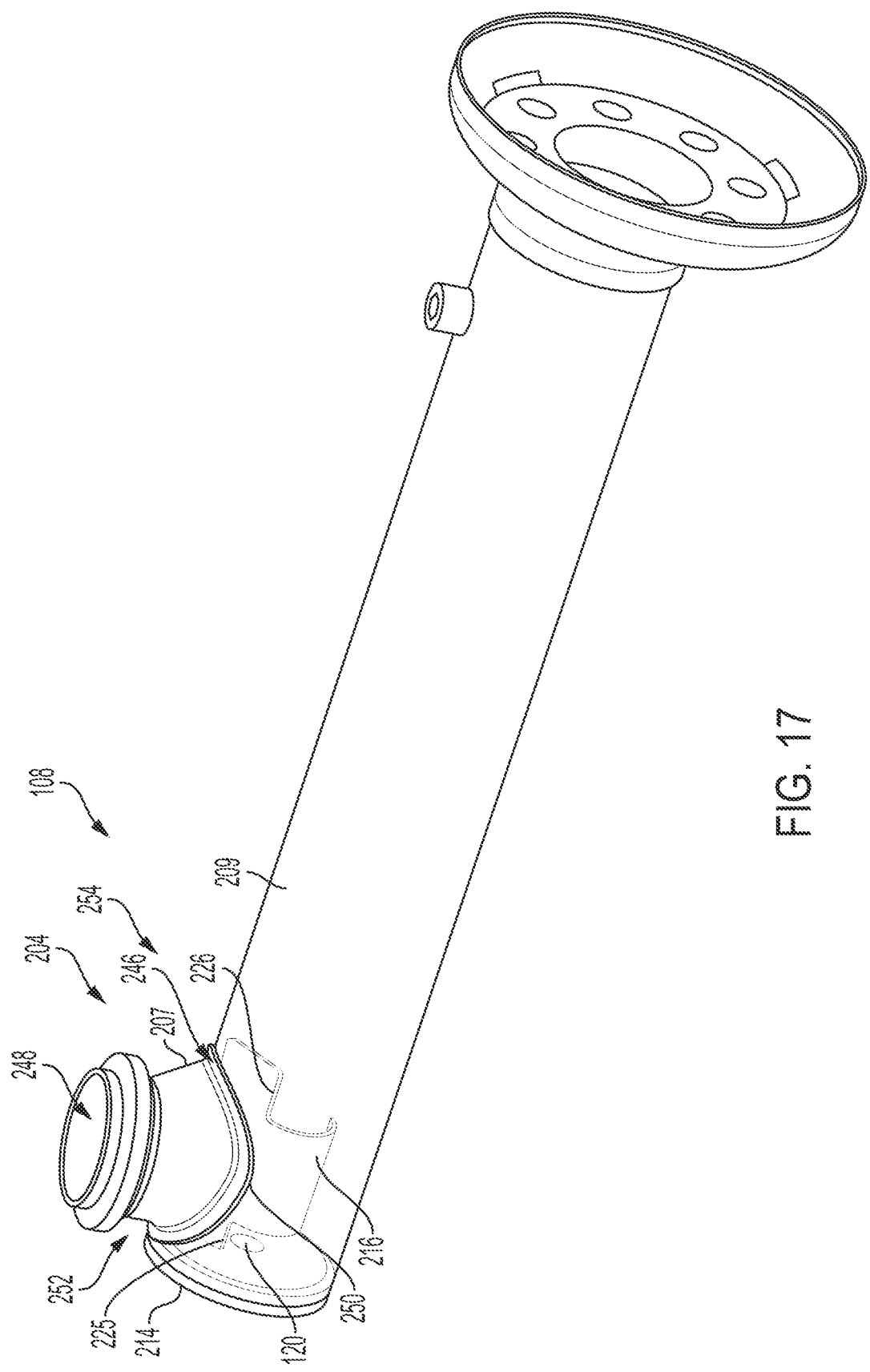
FIG. 17 is a perspective view of an example decomposition chamber with certain components shown with partial transparency.
Figure 18:
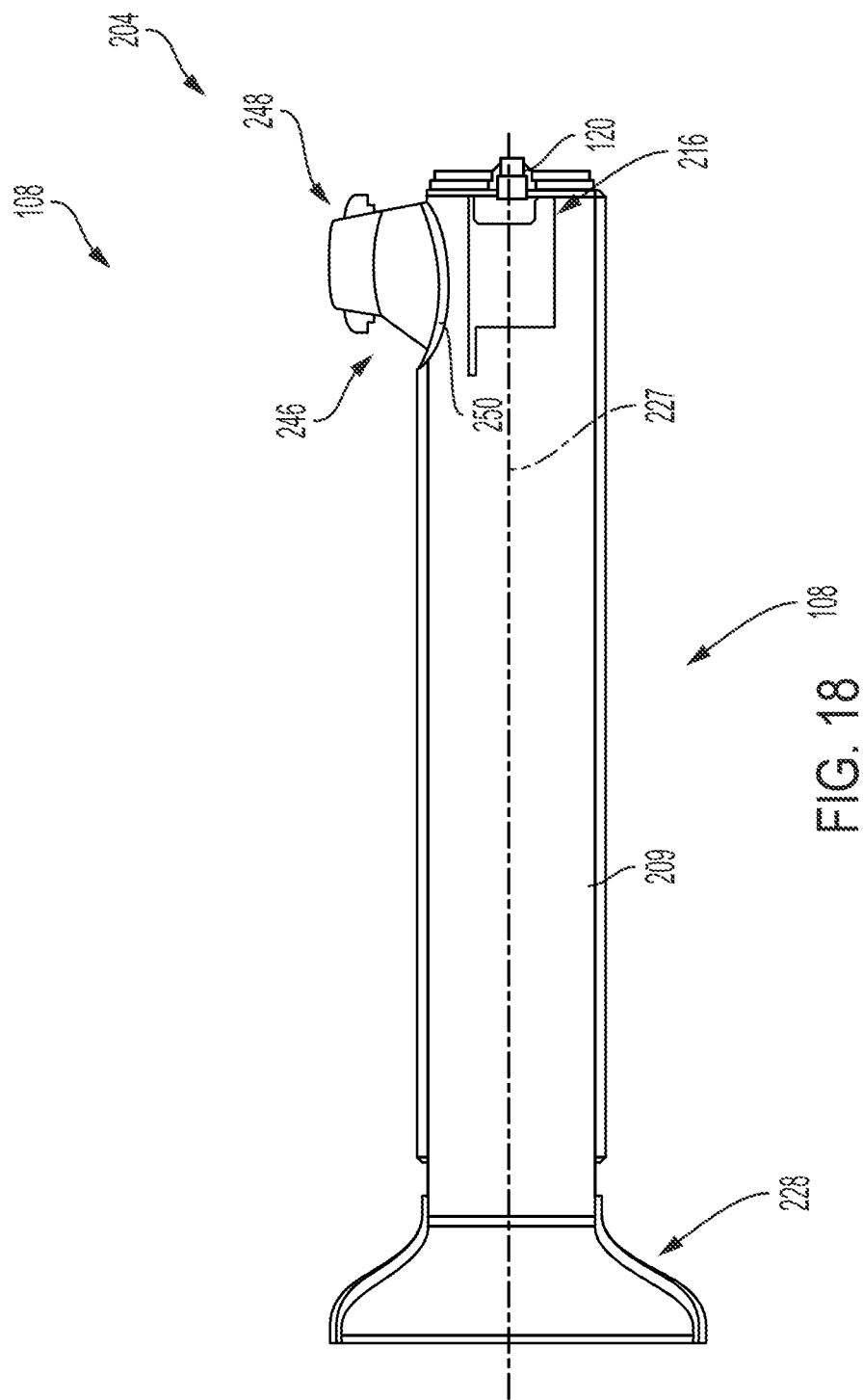
FIG. 18 is a cross-sectional view of the decomposition chamber shown in FIG. 17.
Figure 19:
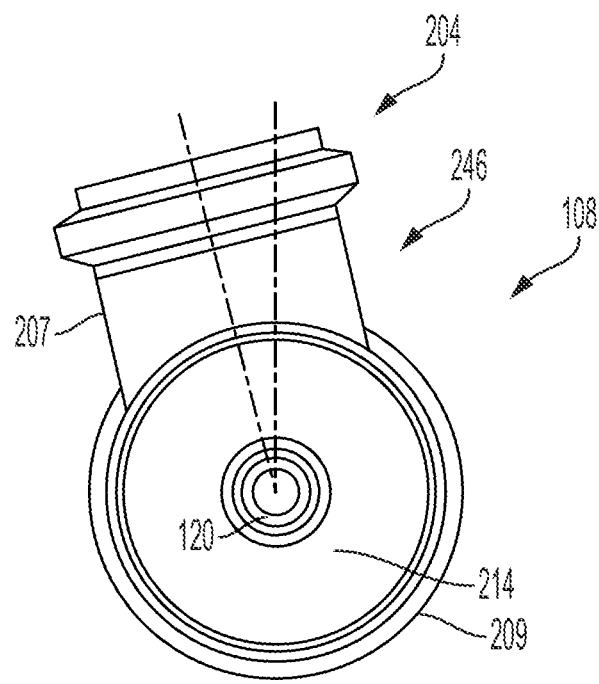
FIG. 19 is an end view of the decomposition chamber shown in FIG. 17.
Figure 20:
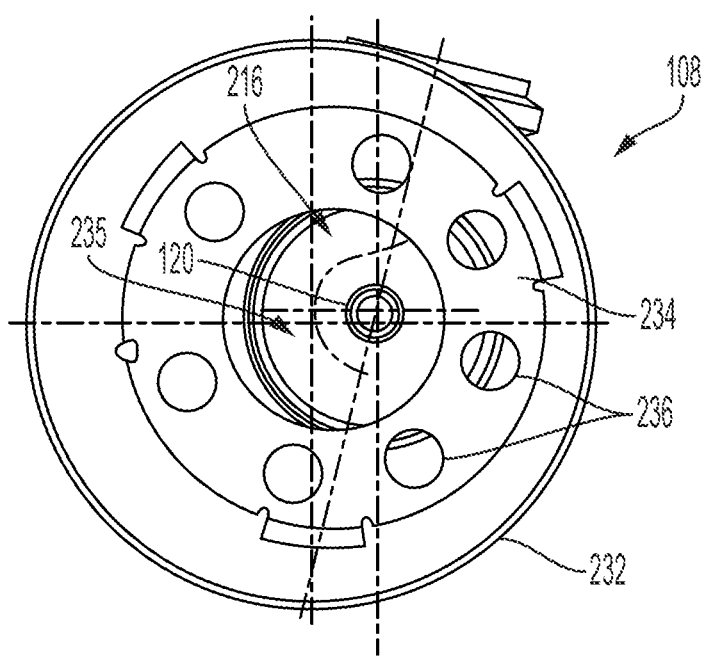
FIG. 20 is a detailed view of a portion of the decomposition chamber shown in FIG. 17.

In operation, exhaust enters the inlet assembly 200, flows through to the decomposition conduit 209, and is swirled due to the guide swirl mixer 216. Reductant is provided into the exhaust via the injector 120 and mixed with the exhaust within the decomposition conduit 209 downstream of the guide swirl mixer 216. This mixing continues along a length of the decomposition conduit 209. The injector 120 provides the reductant into a low pressure region of the exhaust around which the exhaust is caused to swirl by the guide swirl mixer 216. By injecting the reductant into the low pressure region of the exhaust, the reductant may be provided along a larger length of the decomposition conduit 209 than if the reductant were not provided into a low pressure region. The exhaust flows out of the decomposition conduit 209 and into the distributing cone 232. The exhaust is provided through the annular flange 234 and into the SCR catalyst member 110. In various embodiments, such as shown in FIG. 17, the decomposition chamber 108 may include an enlarged interface between the in the inlet conduit 204 and the decomposition conduit 209. This enlarged interface may decrease backpressure provided by the decomposition chamber 108, which would make the decomposition chamber 108 more desirable than other systems that provide higher back pressures.

The inlet conduit 204 is fluidly coupled to the inlet fitting 202 and configured to receive the exhaust from the inlet fitting 202. Additionally, the decomposition conduit 209 is fluidly coupled to the inlet conduit 204 and is configured to receive the exhaust from the inlet conduit 204. The straight portion 207 includes an oval opening 246 along which the inlet conduit 204 is coupled to the decomposition conduit 209.

The oval opening 246 has a major diameter and minor diameter that is smaller than the major diameter. In some embodiments, the oval opening 246 is configured such that the major diameter is between a range, inclusively, of 150% to 250% of the minor diameter. In some embodiments, the oval opening 246 is configured such that the major axis extends along the decomposition conduit axis 210 or is parallel to the decomposition conduit axis 210.

The oval opening 246 reduces backpressure of the component from the exhaust received from the inlet fitting 202 by being enlarged in the direction of the decomposition conduit axis 210. The reduction in the backpressure provided by the oval opening 246 may be used to compensate for increases in backpressure that would otherwise be provided by other components of the decomposition chamber 108. As a result, the oval opening 246 facilitates use of different configurations of the decomposition chamber 108 which may provide various advantages (e.g., reduced cost, increased uniformity index, etc.).

In various embodiments, the inlet conduit 204 has a variable cross-section along the inlet conduit axis 208. For example, the inlet conduit 204 may have a cross-sectional shape that gradually increases in size along the inlet conduit axis 208 at decreasing distances to the decomposition conduit 209. As a result, the inlet conduit 204 has a largest cross-sectional shape proximate the decomposition conduit 209. In one example, the opening formed at an inlet 248 of the straight portion 207 is smaller than the opening formed at the oval opening 246.

The inlet conduit 204 further includes a lip 250 that extends around the oval opening 246, in some embodiments. The lip 250 is configured to be coupled to the decomposition conduit 209 around the oval opening 246. The lip 250 may form a flange along a perimeter of the oval opening 246. The lip 250 may be a saddle shape. The lip 250 may cooperate with the decomposition conduit 209 to form a seal between the inlet conduit 204 and the decomposition conduit 209.

As shown in FIG. 17, the window 226 is formed similar to the slot 225 in some embodiments. Specifically, the window 226 is not bordered on all sides by the second portion 220. Instead, the window 226 is contiguous with a downstream edge of the second portion 220. Such a configuration of the window 226 may be advantageous where the oval opening 246 is included.

Figure 21:
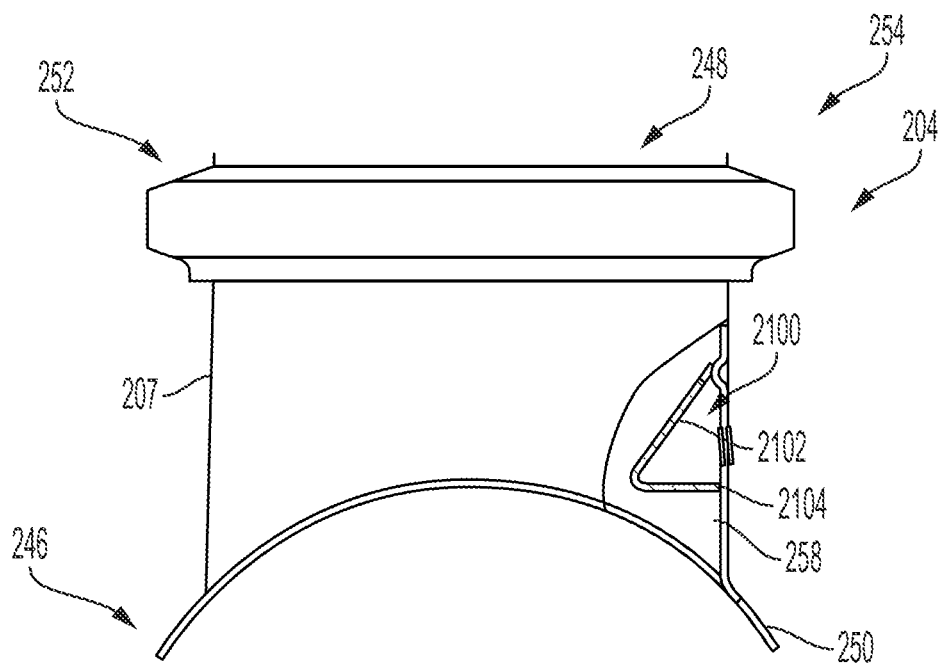
FIG. 21 is a side view of an inlet conduit.
Figure 22:
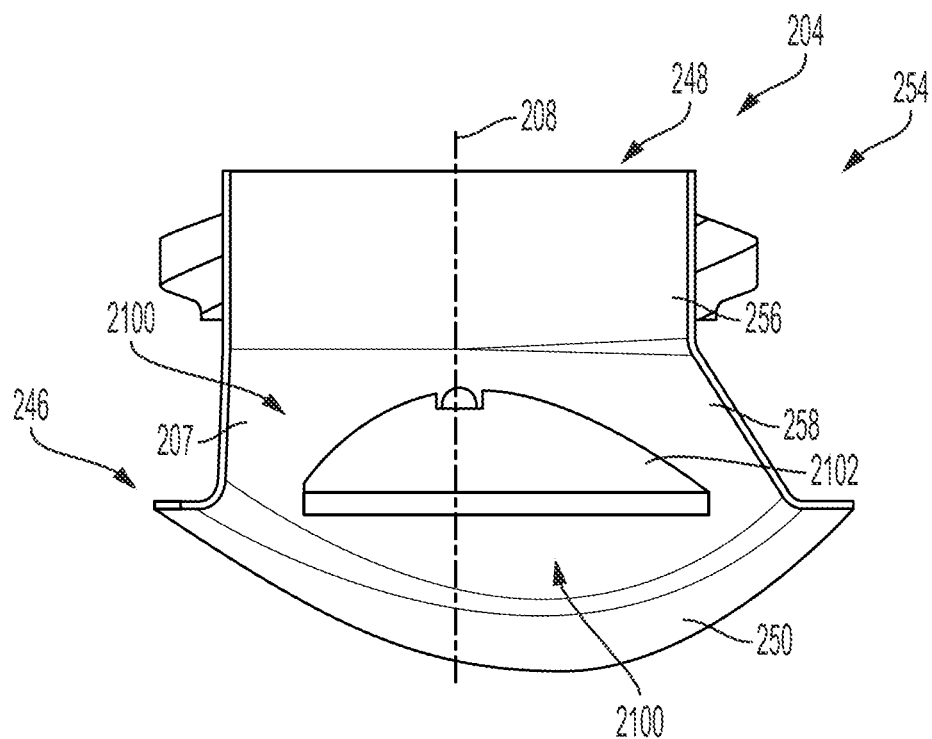
FIG. 22 is a cross-sectional view of the inlet conduit shown in FIG. 21 taken along plane A-A.
Figure 25:
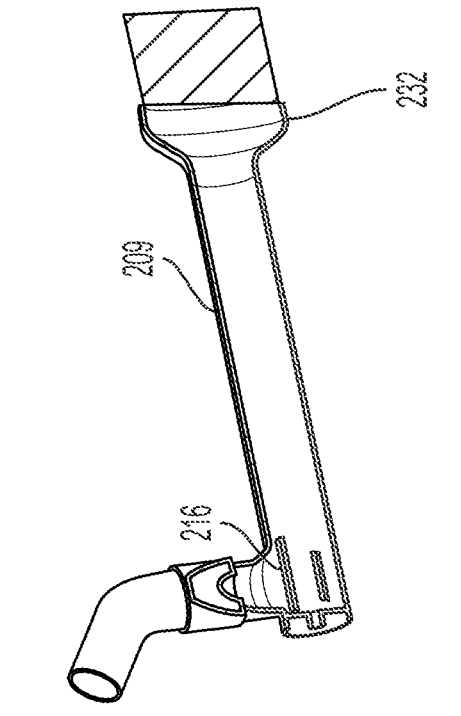
FIG. 25 is another cross-sectional view of the decomposition chamber shown in FIG. 23.
Figure 24:
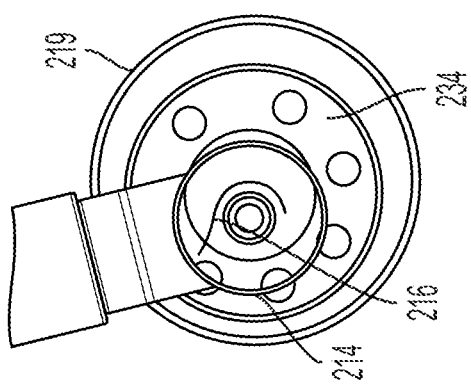
FIG. 24 is another cross-sectional view of the decomposition chamber shown in FIG. 23.
Figure 23:
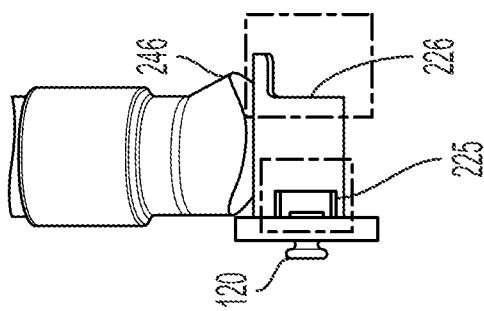
FIG. 23 is a cross-sectional view of a portion of a decomposition chamber.

Referring to FIGS. 21 and 22, the inlet conduit 204 includes an injector side 252 and an outlet side 254. The inlet conduit 204 extends between the injector side 252 and the outlet side 254. In some embodiments, a longest length of the inlet conduit 204 extends between the injector side 252 and the outlet side 254. A first portion of the straight portion 207 extends perpendicularly from the decomposition conduit 209 toward the inlet 248 on the injector side 252 is substantially straight. A second portion of the straight portion 207 extends perpendicularly from the decomposition conduit 209 toward the inlet 248 on the outlet side 254 and includes a second straight segment 256. The second straight segment 256 may be centered on the inlet conduit axis 208. The second portion of the straight portion 207 also includes an angled segment 258. The angled segment 258 is contiguous with the lip 250 and extends between the lip 250 and the second straight segment 256. The angled segment 258 extends from the second straight segment 256 towards the decomposition conduit 209 and away from the inlet conduit axis 208. As shown in FIG. 22, which is a view from the injector side 252 looking towards the outlet side 254, the sides of the straight portion 207 of the inlet conduit 204 remain substantially parallel to the inlet conduit axis 208.

Figure 33:
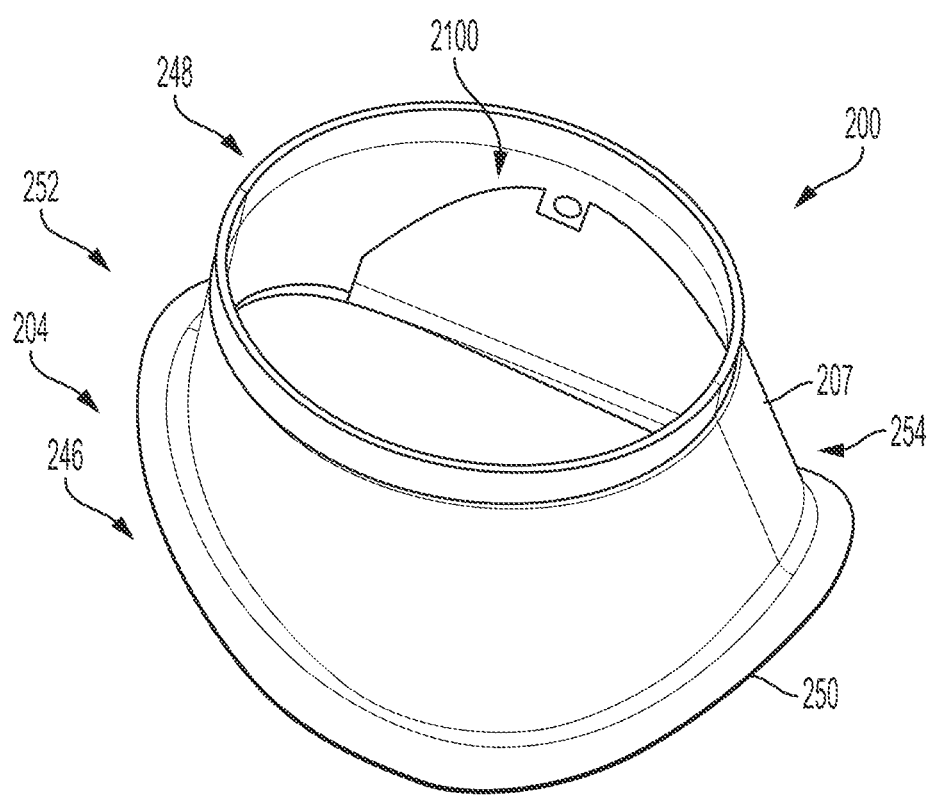
FIG. 33 is a perspective view of the inlet conduit shown in FIG. 21.

As shown FIGS. 21, 22, and 32, the inlet conduit 204 also includes a deflection plate 2100 (e.g., deflector, baffle, etc.). The deflection plate 2100 is coupled to the angled segment 258 and extends towards the injector side 252. The angled segment 258 causes deflection of the exhaust towards the injector 120 within the inlet conduit 204, and therefore upstream of the guide swirl mixer 216. As a result, the deflection plate 2100 functions to assist the guide swirl mixer 216 in concentrating the exhaust into the swirl flow produced by the guide swirl mixer 216. FIG. 33 illustrates the deflection plate 2100 coupled to the angled segment 258.

The deflection plate 2100 includes a deflector 2102 (e.g., deflection surface, etc.). The deflector 2102 extends from the inlet conduit 204 proximate the outlet side 254 downwardly (e.g., towards the endcap 214, etc.) and towards the injector side 252, and therefore the injector 120. In some embodiments, the deflector 2102 is coupled to the inlet conduit 204. For example, the deflector 2102 may include a tab (e.g., projection, etc.) that is welded or fastened to the inlet conduit 204. The deflection plate 2100 also includes a support 2104 (e.g., deflector wall, etc.). The support 2104 extends from the inlet conduit 204 proximate the outlet side 254 towards the injector side 252. A length of the support 2104 may be tailored to provide a target concentration of the exhaust. The support 2104 may be coupled to the inlet conduit 204.

The injector 120 is coupled to the endcap 214. The injector 120 provides the reductant along the injection axis 227. As described herein, in some embodiments, the injection axis 227 is aligned with (e.g., coincident with) the decomposition conduit axis 210. In other embodiments, the injection axis 227 is parallel to and offset from the decomposition conduit axis 210.

In various embodiments, the injection axis 227 extends through a point around which at least a portion of the curved segment 224 extends. For example, where at least a portion of the curved segment 224 extends along a circular arc that is centered on a center point, the injection axis 227 may extend through the center point. The injector 120 may also be off-centered on the endcap 214. In other words, the injection axis 227 is parallel to and offset from the decomposition conduit axis 210. In such off-centered configurations, at least a portion of the curved segment 224 may extend around the injection axis 227.

The curved segment 224 forms a low pressure region of the exhaust around which the exhaust is caused to rotate by the curved segment 224. Formation of the low pressure region by the curved segment 224 enables location of the injection axis 227 within the low pressure region. Injection of the reductant into the low pressure region enables the reductant to flow at greater distances into the decomposition conduit 209 along the injection axis 227. By providing the reductant the reductant in this way, mixing of the reductant within the exhaust may be increased, which may correspondingly increase a conversion efficiency of the SCR catalyst member 110.

Figure 28:
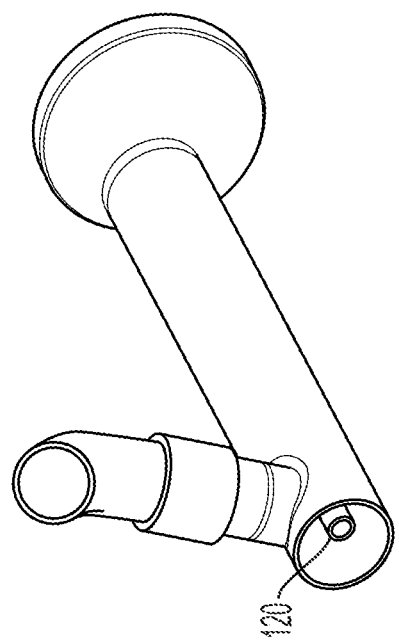
FIG. 28 is another cross-sectional view of the decomposition chamber shown in FIG. 26.
Figure 27:
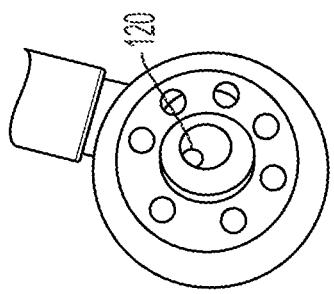
FIG. 27 is another cross-sectional view of the decomposition chamber shown in FIG. 26.
Figure 26:
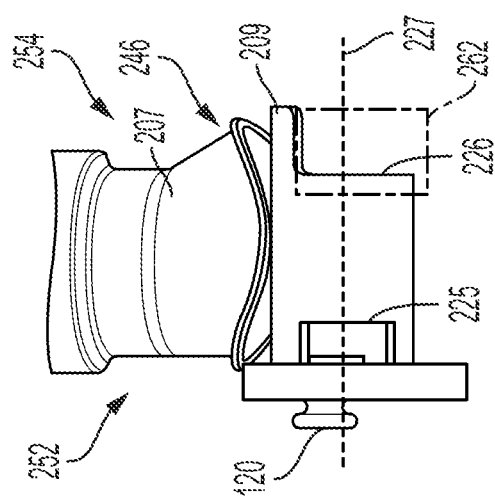
FIG. 26 is a cross-sectional view of a portion of a decomposition chamber.

Referring now to FIGS. 26-28, in some embodiments, the injector 120 is coupled to the endcap 214 in an offset orientation (e.g., so as to form an inclined doser, etc.). In other words, the injector 120 may be coupled to the endcap 214 such that the injection axis 227 is angled relative to the decomposition conduit axis 210. For example, the injector 120 may be coupled to the endcap 214 such that the injection axis 227 intersects the decomposition conduit axis 210 and is separated from the decomposition conduit axis 210 by an angle that is between a range, inclusively, of 5°-55° (e.g., 5°, 10°, 25°, 30°, 45°, 50°, 55°, etc.). The injector 120 may be coupled to the endcap 214 such that the injection axis 227 extends away from the inlet conduit 204.

Figure 30:
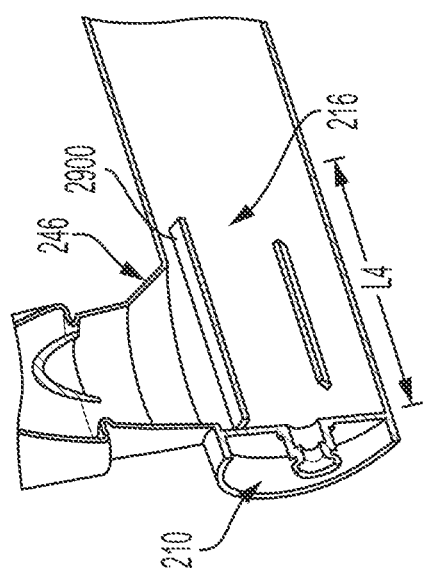
FIG. 30 is another cross-sectional view of the decomposition chamber shown in FIG. 29.
Figure 29:
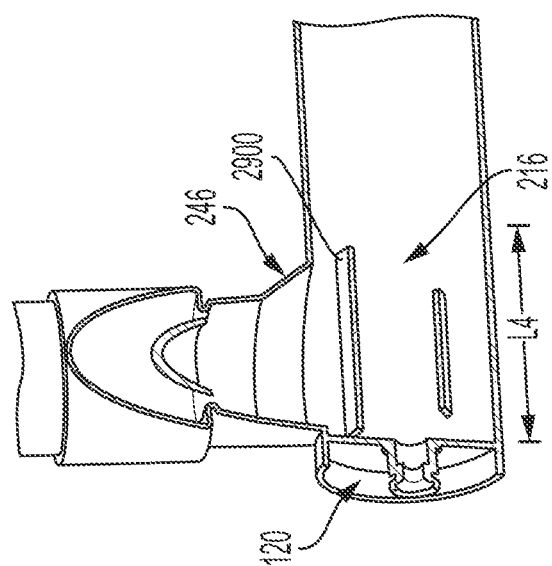
FIG. 29 is a cross-sectional view of a portion of a decomposition chamber.

Referring now to FIGS. 29 and 30, the guide swirl mixer 216 has a length L4 that is larger than a largest diameter of the inlet conduit 204. As a result, the guide swirl mixer 216 extends within a portion of the decomposition conduit 209 downstream of the inlet conduit 204. The length L4 is, in some embodiments, between a range, inclusively, of 30 mm-300 mm (e.g., 30 mm, 100 mm, 121.17 mm, 143.4 mm, 250 mm, 300 mm, etc.). In these arrangements, the guide swirl mixer 216 has an overhang portion 2900 that extends proximate the decomposition conduit 209. The overhang portion 2900 may have a length that is between a range, inclusively, of 10 mm-100 mm (e.g., 10 mm, 20 mm, 30 mm, 40 mm, 50 mm, 60 mm, 70 mm, 80 mm, 90 mm, 100 mm, etc.).

By extending within the decomposition conduit 209, the swirl produced by the guide swirl mixer 216 may be provided at greater distances into the decomposition conduit 209. As a result, mixing the reductant and the exhaust, and therefore a conversion efficiency, may be increased.

Figure 31:
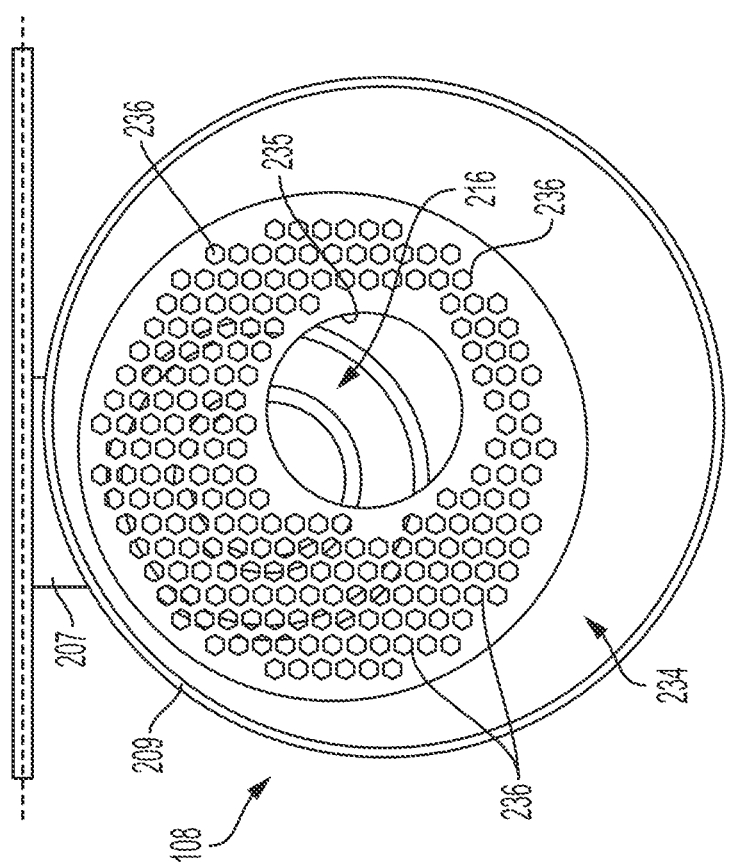
FIG. 31 is a cross-sectional view of a portion of a decomposition chamber.

FIG. 31 illustrates the annular flange 234 according to various embodiments. In this arrangement, the apertures 236 have a substantially smaller diameter than the apertures 236 shown in FIG. 3. As a result of the diameter being smaller, the annular flange 234 may include a significantly larger number of the apertures 236. Additionally, the central opening 235 may be centered on an axis that is offset from an axis that the annular flange 234 is centered on, as shown in FIG. 31.

Figure 35:
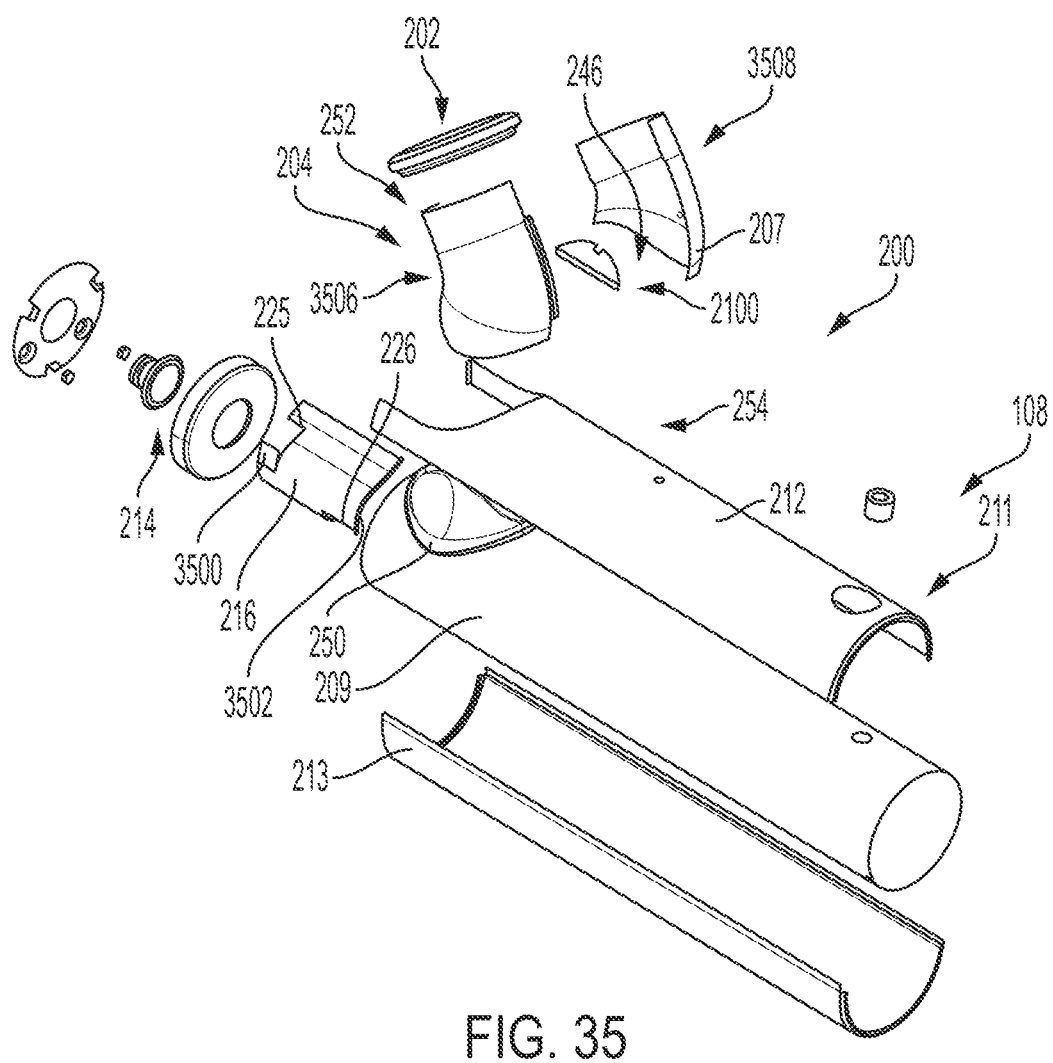
FIG. 35 is an exploded view of another example decomposition chamber.
Figure 36:
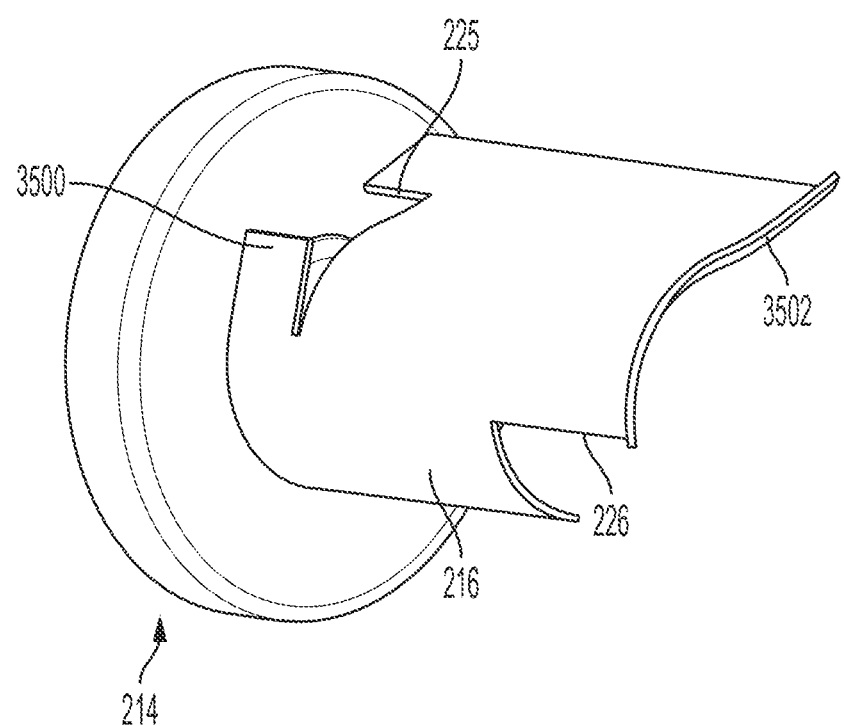
FIG. 36 is a perspective view of a portion of the decomposition chamber shown in FIG. 35.
Figure 37:
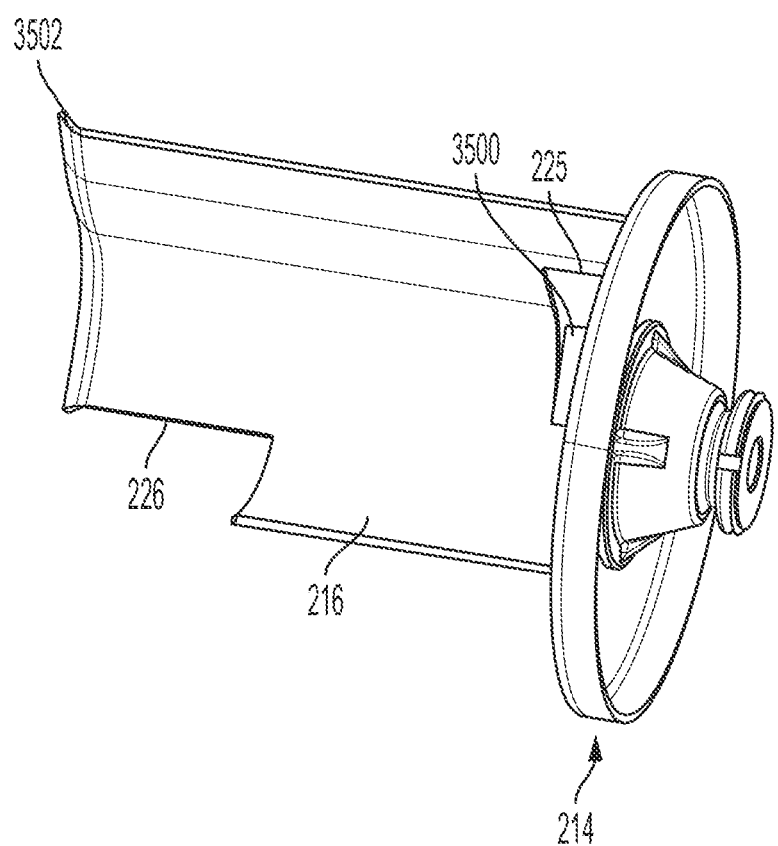
FIG. 37 is another perspective view of the portion of the decomposition chamber shown in FIG. 36.
Figure 38:
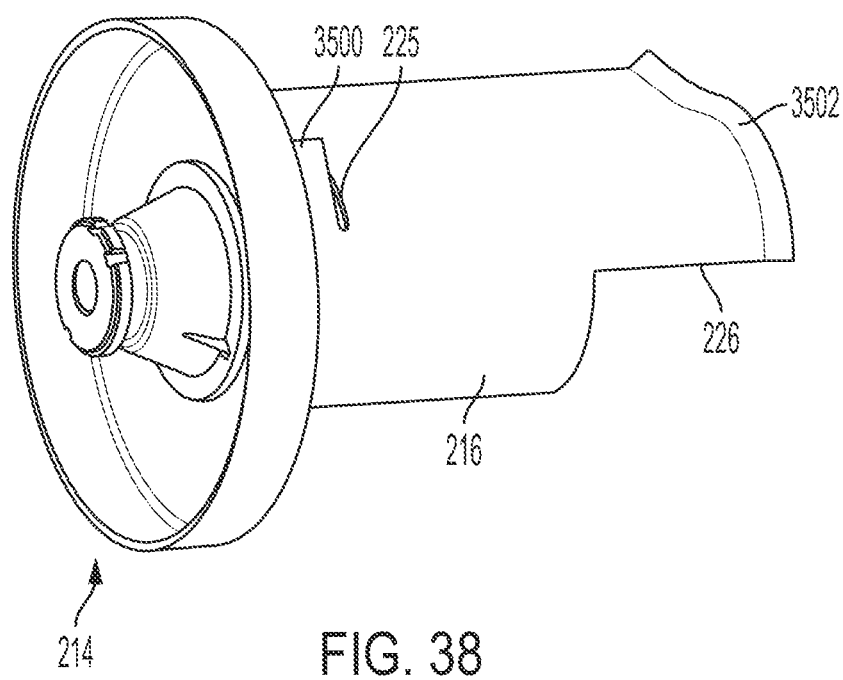
FIG. 38 is another perspective view of the portion of the decomposition chamber shown in FIG. 36.
Figure 39:
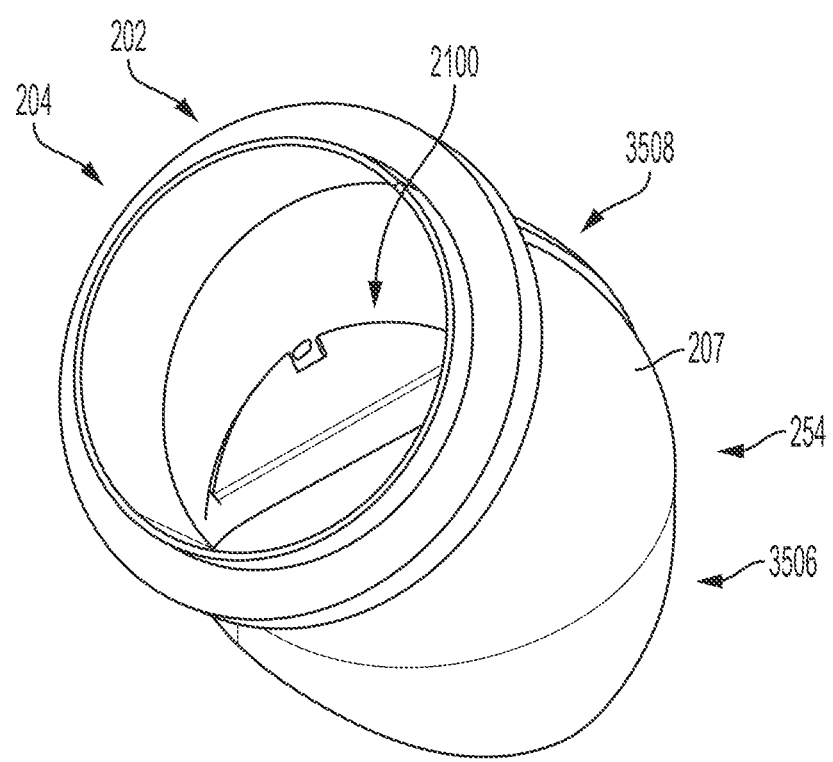
FIG. 39 is a perspective view of another portion of the decomposition chamber shown in FIG. 35.
Figure 40:
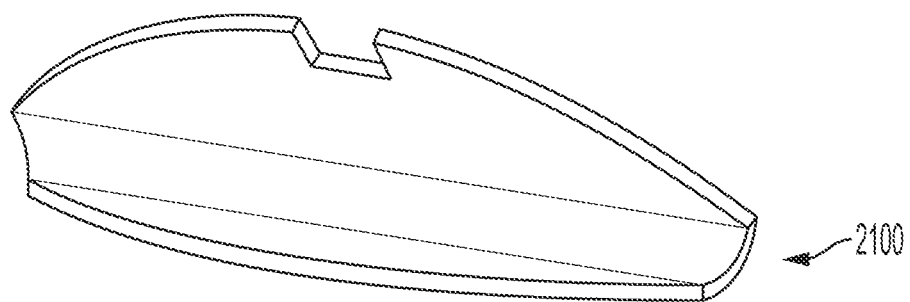
FIG. 40 is a perspective view of another portion of the decomposition chamber shown in FIG. 35.
Figure 41:
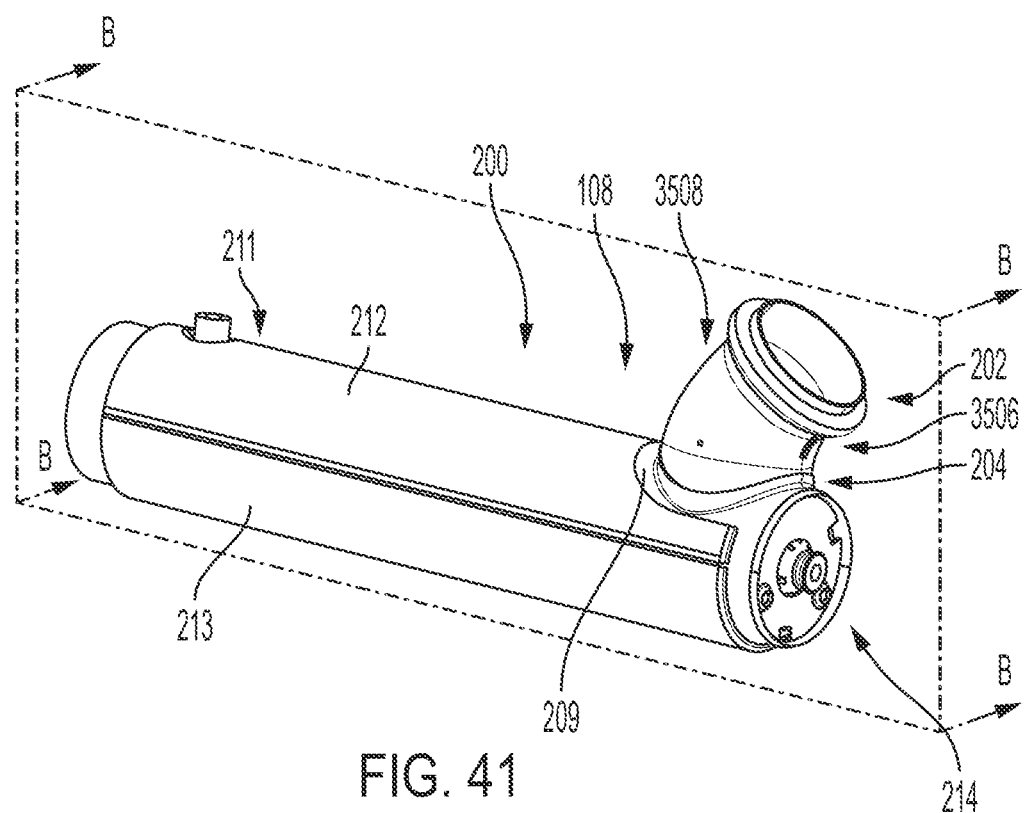
FIG. 41 is a perspective view of the decomposition chamber shown in FIG. 35.

FIGS. 35-43 illustrate the decomposition chamber 108 and components thereof according to various embodiments of the decomposition chamber 108. In these embodiments, the guide swirl mixer 216 is different than the guide swirl mixer 216 shown in, for example, FIGS. 11 and 17. Specifically, the guide swirl mixer 216 includes a plate 3500 (e.g., flap, tab, etc.). The plate 3500 is contiguous with the slot 225 and extends radially outward and away from the decomposition conduit axis 210 and the injection axis 227. The radial outward extension of the plate 3500 is shown in FIG. 36. As a result, the plate 3500 functions to guide exhaust that is flowing around the guide swirl mixer 216 into the slot 225, thereby enhancing mixing of the reductant and the exhaust. Additionally, the guide swirl mixer 216 includes a radial lip 3502 (e.g., edge, deflector, etc.). The radial lip 3502 extends along at least a portion a downstream edge of the guide swirl mixer 216 (e.g., relative to a flow of the reductant from the injector 120 through the guide swirl mixer 216, etc.). At least a portion of the radial lip 3502 extends around the decomposition conduit axis 210 and the injection axis 227. The radial lip 3502 extends radially outward and away from the decomposition conduit axis 210 and the injection axis 227. The radial lip 3502 functions to retain flow of the exhaust around the guide swirl mixer 216, thereby increasing an amount of the exhaust flowing into the slot 225. As a result, the radial lip 3502 enhances mixing of the exhaust and the reductant.

In various embodiments, such as is shown in FIG. 35, the inlet conduit 204 is formed from a first half 3506 (e.g., portion, shell, etc.) and a second half 3508 (e.g., portion, shell, etc.). The first half 3506 is coupled to the second half 3508 to form the inlet conduit 204. Dividing the inlet conduit 204 into the first half 3506 and the second half 3508 during manufacturing may reduce costs, thereby making the decomposition chamber 108 more desirable.

Figure 42:
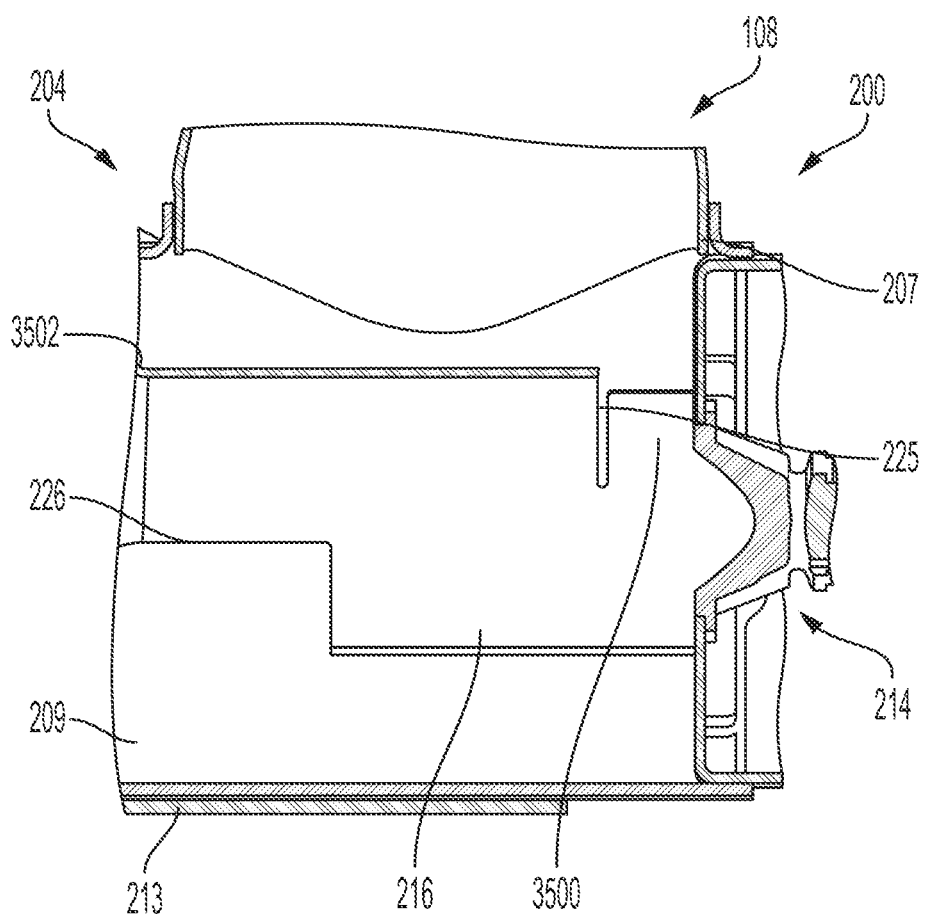
FIG. 42 is a cross-sectional view of the decomposition chamber shown in FIG. 41 taken along plane B-B.
Figure 43:
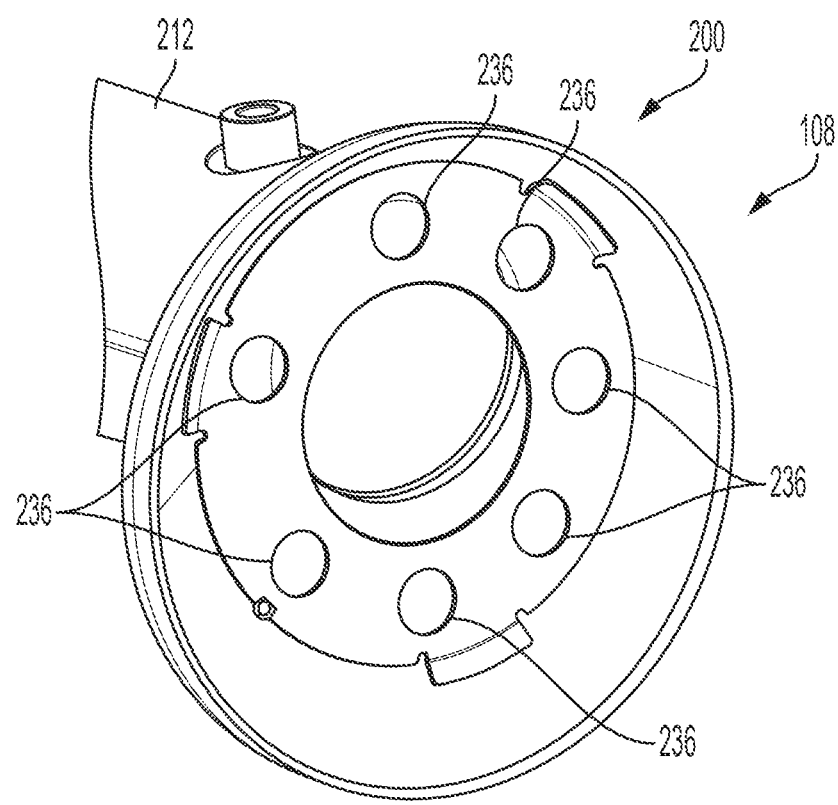
FIG. 43 is a perspective view of the decomposition chamber shown in FIG. 35 with an outlet assembly.

In the decomposition chamber 108 shown in FIGS. 35-43, the endcap 214 is aligned with the straight portion 207, as shown in FIG. 42. As a result, the exhaust flowing along the straight portion 207 can flow directly into the slot 225. This alignment increases flow of the exhaust into the slot 225, thereby increasing mixing of the exhaust and reductant.

Additionally, this alignment mitigates formation of deposits proximate the endcap 214 because exhaust is routed along the endcap 214.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, exhaust, liquid reductant, gaseous reductant, aqueous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes W and includes P, etc.), unless otherwise indicated. Furthermore, a range of values (e.g., W to P, etc.) does not necessarily require the inclusion of intermediate values within the range of values (e.g., W to P can include only W and P, etc.), unless otherwise indicated.

What is claimed is:

1. A decomposition chamber for an exhaust aftertreatment system, the decomposition chamber comprising:
    an inlet conduit configured to receive exhaust, the inlet conduit centered on an inlet conduit axis;
    a decomposition conduit coupled to the inlet conduit;
    an endcap coupled to the decomposition conduit;
    an injector coupled to the endcap and configured to provide reductant into the decomposition conduit along an injection axis; and
    a guide swirl mixer coupled to the endcap and disposed within the decomposition conduit wherein:
    the guide swirl mixer has:
        a first edge at which the guide swirl mixer is attached to the endcap,
        a second edge that extends from the first edge in a direction away from the endcap, the second edge located on an inlet conduit side of the injection axis,
        a third edge that extends from the first edge in a direction away from the endcap, the third edge being on a side opposite the inlet conduit side of the injection axis, and
        a fourth edge that extends from the second edge to the third edge at a side opposite the endcap; and
    wherein the guide swirl mixer includes:
        a flat segment that extends from the second edge, and
        a curved segment that curves only partially around the injection axis and extends from the flat segment to the third edge.

2. The decomposition chamber of claim 1, wherein:
    the inlet conduit axis intersects the injection axis; and
    the inlet conduit axis is separated from the injection axis by an angle that is equal to between 70 degrees and 110 degrees, inclusive.

3. The decomposition chamber of claim 1, wherein:
    the decomposition conduit is centered on a decomposition conduit axis; and
    the endcap is coupled to the decomposition conduit such that the decomposition conduit axis extends through the endcap.

4. The decomposition chamber of claim 3, wherein the injection axis is coincident with the decomposition conduit axis, or parallel to the decomposition conduit axis.

5. The decomposition chamber of claim 1, further comprising a deflection plate coupled to the inlet conduit, the deflection plate comprising:

a deflector extending from the inlet conduit downwardly and towards the endcap, and a support extending from the inlet conduit to the deflector.

6. The decomposition chamber of claim 1, wherein the decomposition conduit, the endcap, and the guide swirl mixer are configured to facilitate flow of exhaust around the guide swirl mixer and the injection axis.

7. The decomposition chamber of claim 1, wherein:
the decomposition conduit is centered on a decomposition conduit axis; and
the injection axis is aligned with the decomposition conduit axis.

8. The decomposition chamber of claim 1, wherein:
the first edge comprises:
a first edge portion extending along the flat segment; and
a second edge portion extending along the curved segment; and
the guide swirl mixer has:
a fifth edge that extends from the first edge portion in a direction away from the endcap;
a sixth edge that extends from the second edge portion in a direction away from the endcap; and
a seventh edge that extends from the fifth edge to the sixth edge at a side opposite the endcap;
the fifth edge, the sixth edge, and the seventh edge defining a slot of the guide swirl mixer, the slot configured to facilitate flow of exhaust through the guide swirl mixer.

9. The decomposition chamber of claim 8, wherein the guide swirl mixer further comprises a plate contiguous with the sixth edge, the plate extending radially outward and away from the injection axis.

10. The decomposition chamber of claim 8, wherein:
a length of the fifth edge extending in the direction away from the endcap is less than a length of the second edge extending in the direction away from the endcap;
a length of the sixth edge extending in the direction away from the endcap is less than a length of the third edge extending in the direction away from the endcap; and
a length of the seventh edge extending from the fifth edge to the sixth edge is less than a length of the fourth edge extending from the second edge to the third edge.

11. The decomposition chamber of 1, wherein the guide swirl mixer has:
an eighth edge extending from the third edge along the curved segment at a side opposite the endcap; and
a ninth edge extending from the eighth edge to the fourth edge in a direction away from the endcap;
wherein the eighth edge and the ninth edge define a window of the guide swirl mixer, the window configured to facilitate flow of exhaust through the guide swirl mixer.

12. The decomposition chamber of claim 11, wherein:
a length of the eighth edge in extending from the third edge along the curved segment is less than a length of the fourth edge extending from the second edge to the fourth edge; and
a length of the ninth edge extending from the eighth edge to the fourth edge is less than a length of the second edge extending from the first edge in the direction away from the endcap.

13. The decomposition chamber of claim 11, wherein:
the first edge comprises:
a first edge portion extending along the flat segment; and
a second edge portion extending along the curved segment; and
the guide swirl mixer has:
a fifth edge that extends from the first edge portion in a direction away from the endcap;
a sixth edge that extends from the second edge portion in a direction away from the endcap; and
a seventh edge that extends from the fifth edge to the sixth edge at a side opposite the endcap;
the fifth edge, the sixth edge, and the seventh defining a slot of the guide swirl mixer, the slot configured to facilitate flow of exhaust through the guide swirl mixer.

14. The decomposition chamber of claim 13, wherein the guide swirl mixer further comprises a plate contiguous with the sixth edge, the plate extending radially outward and away from the injection axis.

15. The decomposition chamber of claim 1, wherein:
the fourth edge has:
a first edge portion extending from the third edge, the first edge portion extending radially outward from the curved segment and away from the injection axis; and
a second edge portion extending from the first edge portion to the second edge, the second edge portion extending radially outward from the flat segment and away from the injection axis;
the first edge portion and the second edge portion defining a radial lip of the guide swirl mixer.

16. The decomposition chamber of claim 15, wherein:
the first edge comprises:
a first edge portion extending along the flat segment; and
a second edge portion extending along the curved segment; and
the guide swirl mixer has:
a fifth edge that extends from the first edge portion in a direction away from the endcap;
a sixth edge that extends from the second edge portion in a direction away from the endcap; and
a seventh edge that extends from the fifth edge to the sixth edge at a side opposite the endcap;
the fifth edge, the sixth edge, and the seventh defining a slot of the guide swirl mixer, the slot configured to facilitate flow of exhaust through the guide swirl mixer.

17. The decomposition chamber of claim 16, wherein the guide swirl mixer further comprises a plate contiguous with the sixth edge, the plate extending radially outward and away from the injection axis.

18. The decomposition chamber of claim 15, wherein the guide swirl mixer has:
an eighth edge extending from the third edge along the curved segment at a side opposite the endcap; and
a ninth edge extending from the eighth edge to the fourth edge in a direction away from the endcap;
wherein the eighth edge and the ninth edge define a window of the guide swirl mixer, the window configured to facilitate flow of exhaust through the guide swirl mixer.

19. The decomposition chamber of claim 18, wherein:
the first edge portion extends from the ninth edge, the first edge portion extending radially outward from the curved segment and away from the injection axis.

20. The decomposition chamber of claim 19, wherein:
the first edge comprises:
a first edge portion extending along the flat segment; and a second edge portion extending along the curved segment; and the guide swirl mixer has:
a fifth edge that extends from the first edge portion in a direction away from the endcap;
a sixth edge that extends from the second edge portion in a direction away from the endcap; and
a seventh edge that extends from the fifth edge to the sixth edge at a side opposite the endcap;

the fifth edge, the sixth edge, and the seventh defining a slot of the guide swirl mixer, the slot configured to facilitate flow of exhaust through the guide swirl mixer.

\* \* \* \* \*